United States Patent
Orlitzky

(10) Patent No.: US 9,441,613 B2
(45) Date of Patent: Sep. 13, 2016

(54) METHODS OF CONTROLLING A LUBRICATOR APPARATUS, METHODS OF COMMUNICATION, AND APPARATUSES AND SYSTEMS

(75) Inventor: Stephan Karl Orlitzky, Delta (CA)

(73) Assignee: STEPHANIA HOLDINGS INC., Delta, BC (CA)

( * ) Notice: Subject to any disclaimer, the term of this patent is extended or adjusted under 35 U.S.C. 154(b) by 0 days.

(21) Appl. No.: 14/342,137

(22) PCT Filed: Aug. 30, 2012

(86) PCT No.: PCT/CA2012/000814
§ 371 (c)(1),
(2), (4) Date: Feb. 28, 2014

(87) PCT Pub. No.: WO2013/029164
PCT Pub. Date: Mar. 7, 2013

(65) Prior Publication Data
US 2014/0209413 A1    Jul. 31, 2014

Related U.S. Application Data

(60) Provisional application No. 61/529,105, filed on Aug. 30, 2011, provisional application No. 61/558,136, filed on Nov. 10, 2011.

(51) Int. Cl.
*F03D 11/00* (2006.01)
*F16N 29/02* (2006.01)
*F16N 11/08* (2006.01)

(52) U.S. Cl.
CPC ........... *F03D 11/0008* (2013.01); *F16N 11/08* (2013.01); *F16N 29/02* (2013.01); *F05B 2260/98* (2013.01); *F16N 2230/02* (2013.01); *F16N 2250/00* (2013.01); *Y02E 10/722* (2013.01)

(58) Field of Classification Search
None
See application file for complete search history.

(56) References Cited

U.S. PATENT DOCUMENTS 1,502,083 A    7/1924    Zoelly
3,424,022 A    1/1969    Greenberg et al.
(Continued)

FOREIGN PATENT DOCUMENTS

CA    2635788 A1    11/2008
CH    567 679 A5    10/1975
(Continued)

OTHER PUBLICATIONS

International Search Report mailed Dec. 28, 2012, for PCT Application No. PCT/CA2012/000814 (3 pages).
(Continued)

*Primary Examiner* — William E Dondero
*Assistant Examiner* — Mark K Buse
(74) *Attorney, Agent, or Firm* — Kilpatrick Townsend & Stockton LLP

(57) ABSTRACT

A method of controlling a lubricator apparatus, according to one illustrative embodiment, comprises: receiving a signal representing rotation of a lubricant applicator in rotatable engagement with an object to be lubricated; and causing the lubricator apparatus to dispense lubricant through the lubricant applicator to the object to be lubricated in response to the signal. A method of communication, according to another illustrative embodiment, comprises: receiving, at a communication apparatus, a plurality of input operational property signals; transmitting an output operational property signal from the communication apparatus to a data collection apparatus, the output operational property signal representing at least one of the measurements; receiving, at the communication apparatus, an input control signal; and controlling at least one device of the system in response to the input control signal. Other illustrative embodiments include a computer-readable medium, a lubricator apparatus, a system, and a communication apparatus.

26 Claims, 19 Drawing Sheets

(56) References Cited

U.S. PATENT DOCUMENTS

| | | | |
|---|---|---|---|
| 3,608,672 A | 9/1971 | Dandridge | |
| 3,822,607 A | 7/1974 | Tharaldsen | |
| 4,023,648 A | 5/1977 | Orlitzky et al. | |
| 4,159,046 A * | 6/1979 | Frost et al. | 184/15.2 |
| 4,328,843 A | 5/1982 | Fujii | |
| 4,534,005 A * | 8/1985 | Nagashima et al. | 700/282 |
| 4,648,486 A | 3/1987 | Kayser et al. | |
| 4,671,386 A | 6/1987 | Orlitzky | |
| 5,020,636 A * | 6/1991 | Daeges | 184/6.26 |
| 5,022,493 A * | 6/1991 | Buckelew | 184/16 |
| 5,060,760 A | 10/1991 | Long et al. | |
| 5,080,195 A | 1/1992 | Mizumoto et al. | |
| 5,242,033 A | 9/1993 | Toraason | |
| 5,404,966 A | 4/1995 | Yang | |
| 5,622,239 A * | 4/1997 | Orlitzky | 184/6.12 |
| 5,669,839 A | 9/1997 | Graf et al. | |
| 5,813,496 A | 9/1998 | Hyvönen et al. | |
| D411,963 S | 7/1999 | Whitley | |
| 5,921,350 A | 7/1999 | Tsai | |
| 6,101,427 A | 8/2000 | Yang | |
| 6,125,969 A | 10/2000 | Graf et al. | |
| 6,189,656 B1 | 2/2001 | Morgenstern et al. | |
| 6,244,387 B1 | 6/2001 | Paluncic et al. | |
| 7,104,116 B2 | 9/2006 | Discenzo | |
| 7,275,420 B2 | 10/2007 | Discenzo | |
| 7,455,170 B2 * | 11/2008 | Beauchamp | B65G 45/08 184/15.1 |
| 7,871,353 B2 | 1/2011 | Nichols et al. | |
| 8,499,738 B2 * | 8/2013 | Storch et al. | 123/196 R |
| 8,659,180 B2 * | 2/2014 | Earl | 290/54 |
| 2004/0197040 A1 | 10/2004 | Walker et al. | |
| 2004/0250623 A1 | 12/2004 | Walker et al. | |
| 2005/0137763 A1 | 6/2005 | Watkins | |
| 2006/0231341 A1 * | 10/2006 | Wech | 184/6.22 |
| 2007/0144834 A1 | 6/2007 | Matzan | |
| 2009/0133531 A1 | 5/2009 | Ono et al. | |
| 2009/0133962 A1 | 5/2009 | Orlitzky et al. | |
| 2009/0192728 A1 | 7/2009 | Wright et al. | |
| 2009/0228239 A1 | 9/2009 | Inoue et al. | |
| 2010/0217446 A1 | 8/2010 | Orlitzky et al. | |

FOREIGN PATENT DOCUMENTS

| | | |
|---|---|---|
| DE | 19711605 C1 | 6/1998 |
| DE | 20 2011 000 275 U1 | 5/2011 |
| EP | 0489603 A2 | 6/1992 |
| EP | 926426 A1 | 6/1999 |
| EP | 1052445 A1 | 11/2000 |
| EP | 1686361 A2 | 8/2006 |
| EP | 2101102 A2 | 9/2009 |
| GB | 561250 | 5/1944 |
| GB | 1209792 A | 10/1970 |
| GB | 2003238 A | 3/1979 |
| GB | 2405910 A | 3/2005 |
| GB | 2416006 B | 5/2006 |
| JP | 03-051569 A | 3/1991 |
| JP | 06-248926 A | 9/1994 |
| JP | 08-015289 A | 1/1996 |
| JP | 2004-239340 A | 8/2004 |
| JP | 2005090644 A | 4/2005 |
| SU | 1710890 A1 | 2/1992 |
| WO | 2011/025430 A1 | 3/2011 |

OTHER PUBLICATIONS

International Preliminary Report on Patentability completed Jan. 8, 2014, for PCT Application No. PCT/CA2012/000814 (29 pages).

Extended European Search Report mailed Apr. 13, 2015, from European Application No. 12827676.3 (6 pages).

* cited by examiner

METHODS OF CONTROLLING A LUBRICATOR APPARATUS, METHODS OF COMMUNICATION, AND APPARATUSES AND SYSTEMS

RELATED APPLICATIONS

This application is a United States National Phase of International Application No. PCT/CA2012/000814, filed Aug. 30, 2012, which claims the benefit of U.S. provisional patent application No. 61/529,105 filed Aug. 30, 2011, and claims the benefit of U.S. provisional patent application No. 61/558,136 filed Nov. 10, 2011. The entire contents of International Application No. PCT/CA2012/000814, filed Aug. 30, 2012, the entire contents of U.S. provisional patent application No. 61/529,105 filed Aug. 30, 2011, and the entire contents of U.S. provisional patent application No. 61/558,136 filed Nov. 10, 2011, are incorporated by reference herein.

BACKGROUND

Numerous lubricator apparatuses are known, such as lubricator apparatuses available from A.T.S. Electro-Lube International Inc. of Delta, British Columbia, Canada, for example. Such lubricator apparatuses generally dispense lubricant to elements of a system. Such elements might include a gear or a chain of the system, for example. One known lubricator apparatus includes an idler gear having teeth that engage a gear or a chain to be lubricated, for example. Such an idler gear may include a lubricant inlet and at least one lubricant outlet where the idler gear contacts working surfaces of the gear or chain.

Lubrication needs of such elements may change from time to time. For example, if such an element moves infrequently or intermittently, then a lubricator apparatus that dispenses lubricant periodically at fixed time intervals, for example, may disadvantageously apply excessive lubricant when the element does not move for an extended period of time, or may disadvantageously apply insufficient lubricant during a period of time when the element moves a relatively large amount.

Also, in various systems, monitoring operational properties (such as temperature or presence of a dangerous gas, for example) and controlling devices (such as lubricator apparatuses or other devices) may be desirable, but known systems for monitoring such operational properties and for controlling such devices may be cumbersome to install or use or may otherwise be unsuitable for certain applications.

SUMMARY

According to one illustrative embodiment, there is provided a method of controlling a lubricator apparatus, the method comprising: receiving a signal representing rotation of a lubricator applicator in rotatable engagement with an object to be lubricated; and causing the lubricator apparatus to dispense lubricant through the lubricant applicator to the object to be lubricated in response to the signal.

According to another illustrative embodiment, there is provided a computer-readable medium having stored thereon instructions to direct a processor circuit to implement the method.

According to another illustrative embodiment, there is provided a lubricator apparatus comprising the computer-readable medium and the processor circuit in communication with the computer-readable medium.

According to another illustrative embodiment, there is provided a lubricator apparatus comprising: a lubricant applicator engageable for rotation about an axis of rotation with an object to be lubricated; a means for generating a signal representing rotation of the lubricant applicator about the axis of rotation; and a means for dispensing lubricant through the lubricant applicator to the object to be lubricated in response to the signal.

According to another illustrative embodiment, there is provided a lubricator apparatus comprising: a lubricant applicator engageable for rotation about an axis of rotation with an object to be lubricated; a detector configured to generate a signal representing rotation of the lubricant applicator about the axis of rotation; a lubricant dispenser in fluid communication with the lubricant applicator to dispense lubricant through the lubricant applicator to the object to be lubricated; and a processor circuit in communication with the detector to receive the signal, the processor circuit further in communication with the lubricant dispenser to control the lubricant dispenser; wherein the processor circuit is configured to cause the lubricant dispenser to dispense lubricant through the lubricant applicator to the object to be lubricated in response to the signal.

According to another illustrative embodiment, there is provided a system comprising: any one of the apparatuses; and the object to be lubricated.

According to another illustrative embodiment, there is provided a method of communication, the method comprising: receiving, at a communication apparatus, a plurality of input operational property signals, each one of the plurality of input operational property signals representing a measurement, from a respective one of a plurality of sensor assemblies of a system, of at least one of the plurality of operational properties; transmitting an output operational property signal from the communication apparatus to a data collection apparatus, the output operational property signal representing at least one of the measurements; receiving, at the communication apparatus, an input control signal; and controlling at least one device of the system in response to the input control signal.

According to another illustrative embodiment, there is provided a communication apparatus comprising: a means for receiving a plurality of input operational property signals, each one of the plurality of input operational property signals representing a measurement, from a respective one of a plurality of sensor assemblies of a system, of at least one of the plurality of operational properties; a means for transmitting an output operational property signal to a data collection apparatus, the output operational property signal representing at least one of the measurements; a means for receiving an input control signal; and a means for controlling at least one device of the system in response to the input control signal.

According to another illustrative embodiment, there is provided a communication apparatus comprising: a processor circuit; and a communication interface in communication with the processor circuit; wherein the communication interface is configured to receive a plurality of input operational property signals, each one of the plurality of input operational property signals representing a measurement, from a respective one of a plurality of sensor assemblies of a system, of at least one of the plurality of operational properties; wherein the processor circuit is configured to cause the communication interface to transmit an output operational property signal to a data collection apparatus, the output operational property signal representing at least one of the measurements; wherein the communication interface is configured to receive an input control signal; and wherein the processor circuit is configured to control at least one device of the system in response to the input control signal.

According to another illustrative embodiment, there is provided a system comprising: any one of the communication apparatuses; and the plurality of sensor assemblies. Each one of the plurality of sensor assemblies: includes a respective sensor configured to measure at least one measurement of at least one of a plurality of operational properties of a system; and is configured to transmit an operational property signal representing the at least one measurement to the apparatus.

According to another illustrative embodiment, there is provided a system comprising: any one of the communication apparatuses; and the at least one device configured to be controlled by the apparatus.

DETAILED DESCRIPTION

Figure 1:
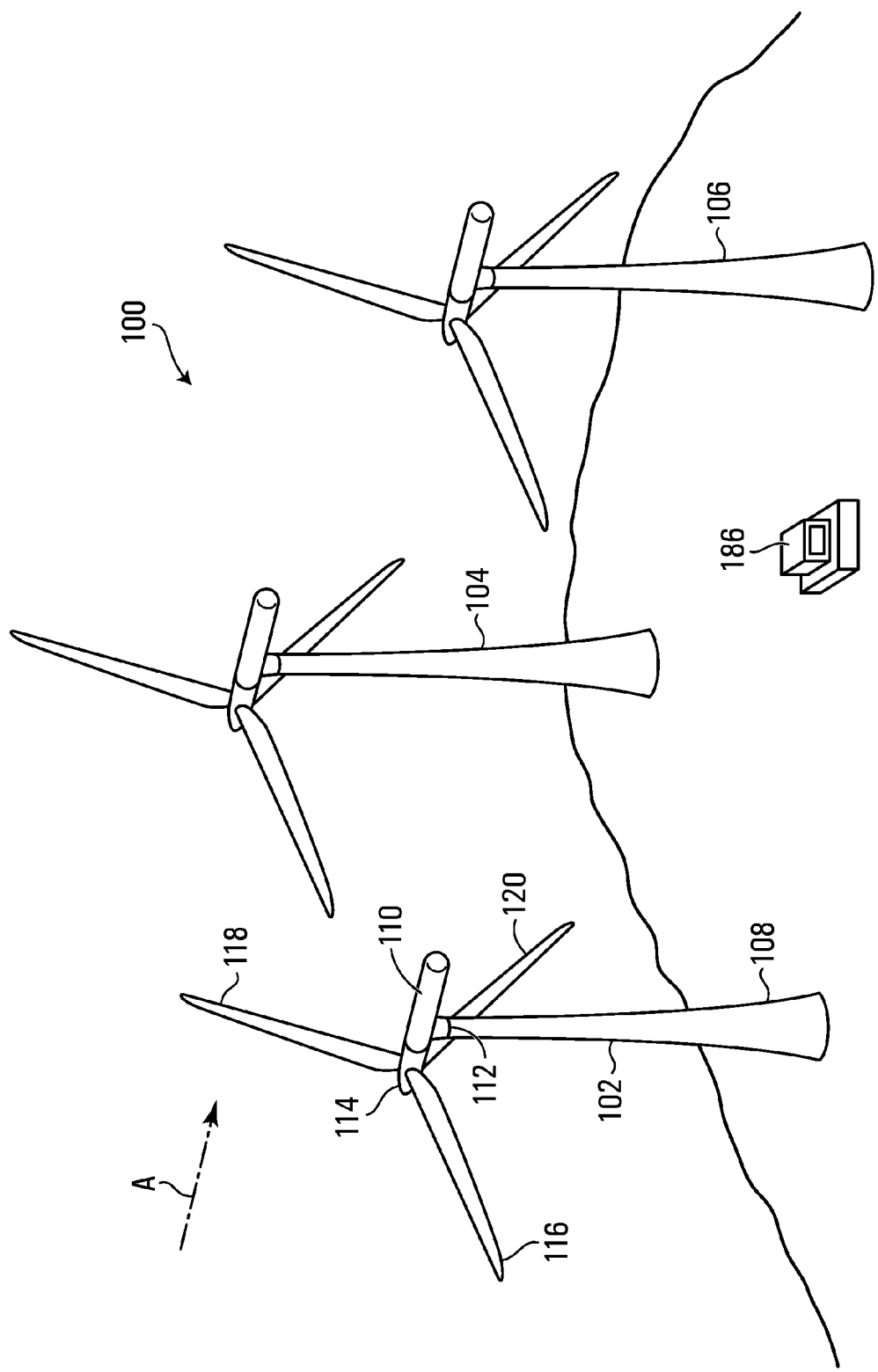
FIG. 1 is an oblique view of an illustrative set of wind turbines.

Referring to FIG. 1, an illustrative set of wind turbines 100 includes wind turbines 102, 104, and 106. The wind turbine 102 includes a tower 108, and a nacelle 110 rotatably mounted to the tower 108 on a yaw bearing 112 for rotation about a generally vertical yaw axis. The wind turbine 102 also includes a rotor 114 carrying three blades 116, 118, and 120 in the embodiment shown. The wind turbines 104 and 106 are substantially the same as the wind turbine 102, and each of the wind turbines may more generally be referred to as a system.

Figure 2:
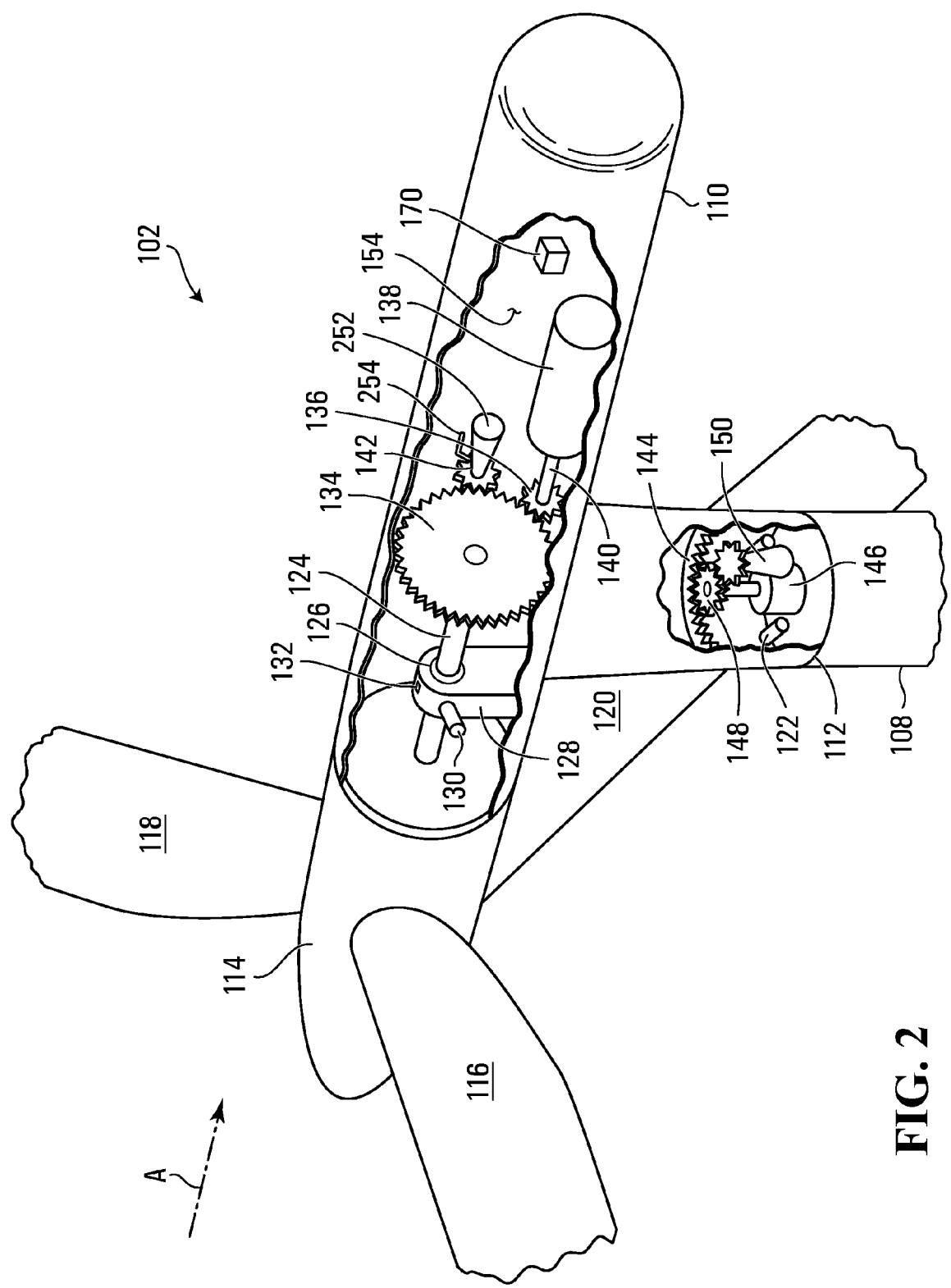
FIG. 2 is a cutaway oblique view of a wind turbine of the set of wind turbines of FIG. 1.

Referring to FIG. 2, the wind turbine 102 also includes a first single-point lubricator apparatus 122 positioned in an inner cavity of the tower 108 for dispensing lubricant on the yaw bearing 112, which may more generally be referred to as an element of the wind turbine 102. The wind turbine 102 also includes a main shaft 124 coupled, at a first end, to the rotor 114. The wind turbine 102 also includes a main bearing 126 mounted on a bearing mount 128. The main bearing 126 rotatably holds the main shaft 124, and thus the rotor 114 and blades 116, 118, and 120, on the nacelle 110. Further, the wind turbine 102 includes a second single-point lubricator apparatus 130 positioned in the nacelle 110 for dispensing lubricant on the main bearing 126 (which may also more generally be referred to as an element of the wind turbine 102), and the bearing mount 128 also holds an acceleration sensor assembly 132 at a position spaced apart from the second single-point lubricator apparatus 130 to measure acceleration at a point spaced apart from the single-point lubricator apparatuses of the wind turbine 102. The acceleration sensor assembly 132 includes an acceleration sensor that measures acceleration, and thus vibration, of the bearing mount 128, which may also more generally be referred to as an element of the wind turbine 102. In alternative embodiments, the acceleration sensor assembly 132 may be positioned on the main shaft 124, and the main shaft in such alternative embodiments may also more generally be referred to as an element of the wind turbine 102.

The main shaft 124 is also coupled, at a second end opposite the first end, to a first gear 134 engaged with a second gear 136 coupled to an electric generator 138 by a generator shaft 140. Wind in the direction of the arrow A causes rotation of the blades 116, 118, and 120 that in turn causes rotation of the main shaft 124 and generator shaft 140 to cause the electric generator 138 to generate electricity. The second gear 136 has a smaller radius than the first gear 134, and thus the generator shaft 140 in the embodiment shown turns at a larger angular speed than the main shaft 124. The embodiment shown also includes a third single-point lubricator apparatus 142 for dispensing lubricant on the first gear 134 (which may also more generally be referred to as an element of the wind turbine 102), and lubricant dispensed on the first gear 134 may be transferred to the second gear 136 by rotation of those gears.

In the embodiment shown, the nacelle 110 includes a ring gear 144 proximate a top end of the tower 108, and the tower 108 includes a motor 146 for rotating a pinion gear 148 engaged with the ring gear 144. The motor 146 may thus rotate the pinion gear 148 to rotate the nacelle 110 about the yaw axis. The embodiment shown also includes a fourth single-point lubricator apparatus 150 for dispensing lubricant on the pinion gear 148 (which may also more generally be referred to as an element of the wind turbine 102), and lubricant dispensed on the pinion gear 148 is transferred to the ring gear 144 by rotation of those gears.

Figure 3:
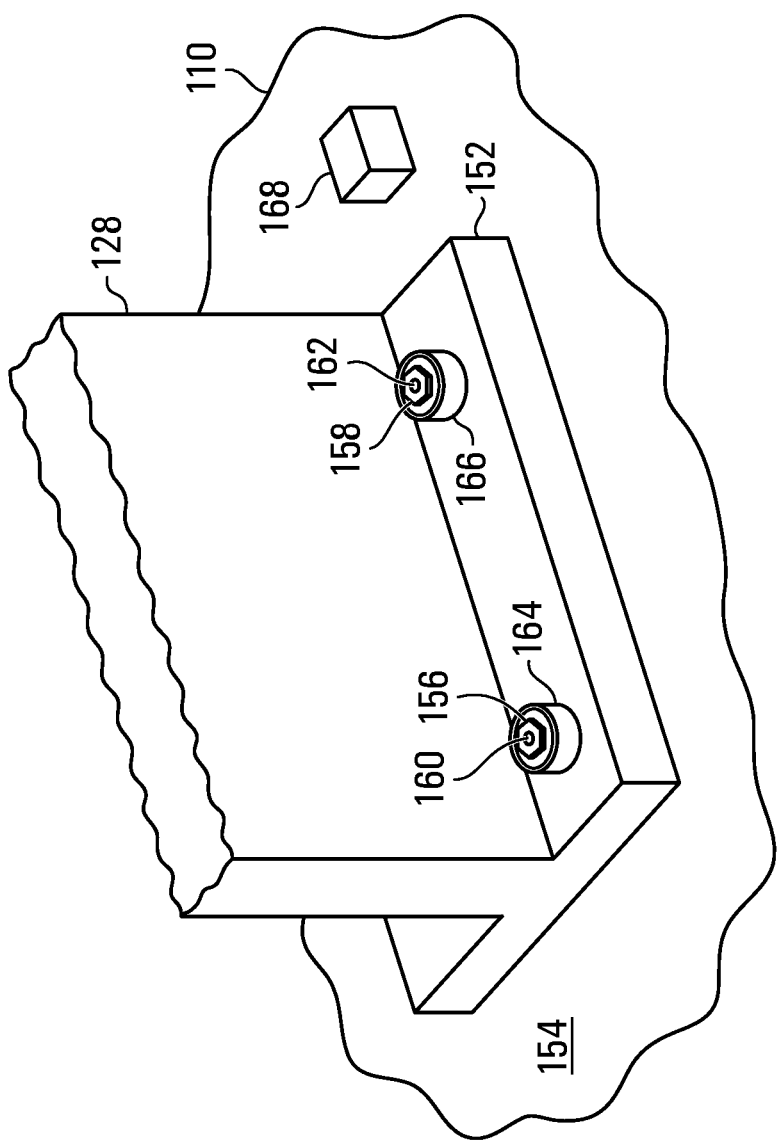
FIG. 3 is an oblique view of a mounting flange of the wind turbine of FIG. 2.

Referring to FIG. 3, the bearing mount 128 in the embodiment shown includes a mounting flange 152 mounted to an inner surface 154 of the nacelle 110 by a plurality of fasteners including nuts 156 and 158 coupled to respective bolts 160 and 162 on the nacelle 110. The nuts 156 and 158 hold the bearing mount 128, and thus the main shaft 124, rotor 114, and blades 116, 118, and 120 relative to the nacelle 110, and thus it is important to know if one or more of the nuts 156 and 158 become loose. Therefore, the embodiment shown includes sensor assemblies 164 and 166 coupled to the nuts 156 and 158 respectively. The sensor assemblies 164 and 166 are spaced apart from the single-point lubricator apparatuses.

Figure 4:
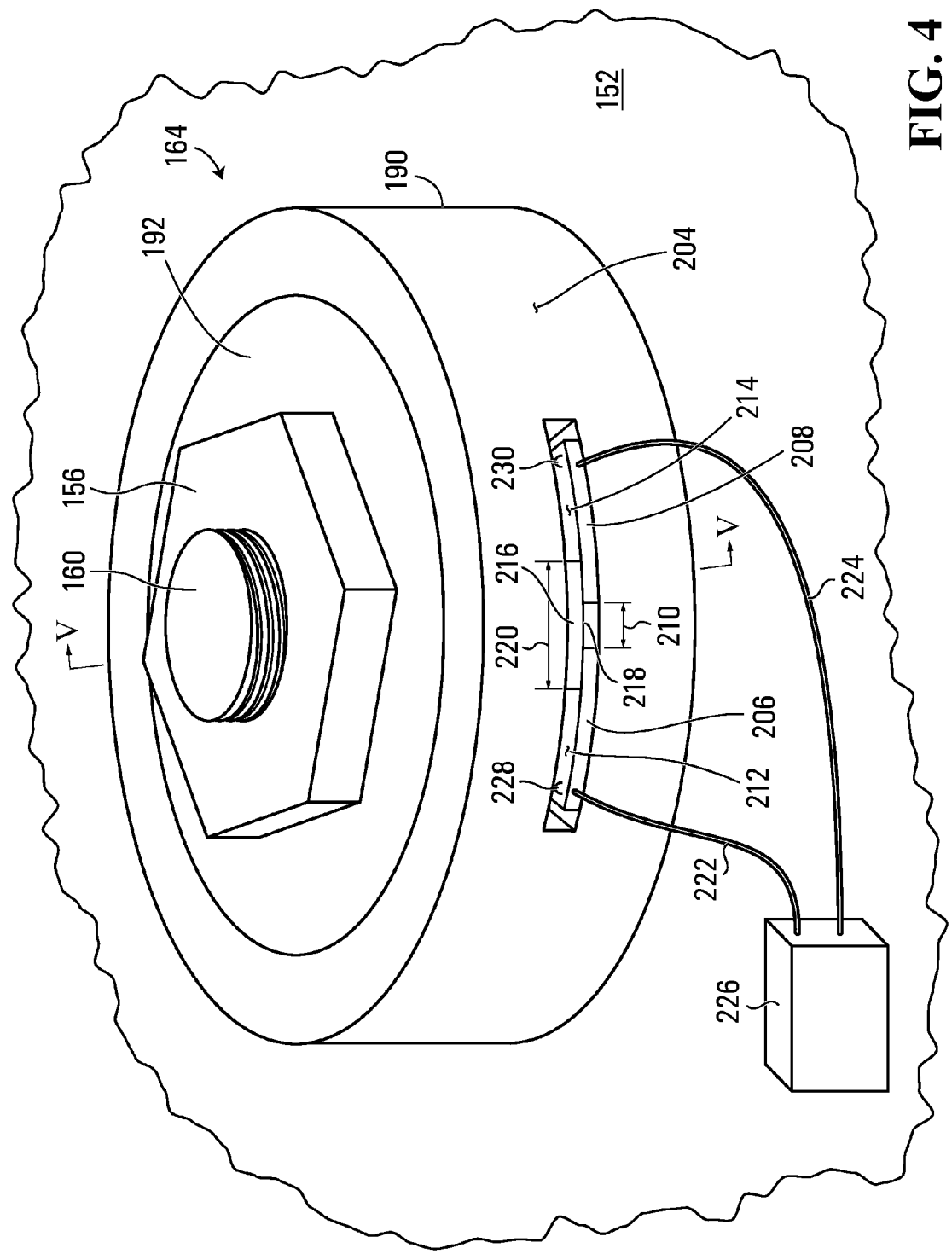
FIG. 4 is an enlarged oblique view of a sensor assembly of the wind turbine of FIG. 2.
Figure 5:
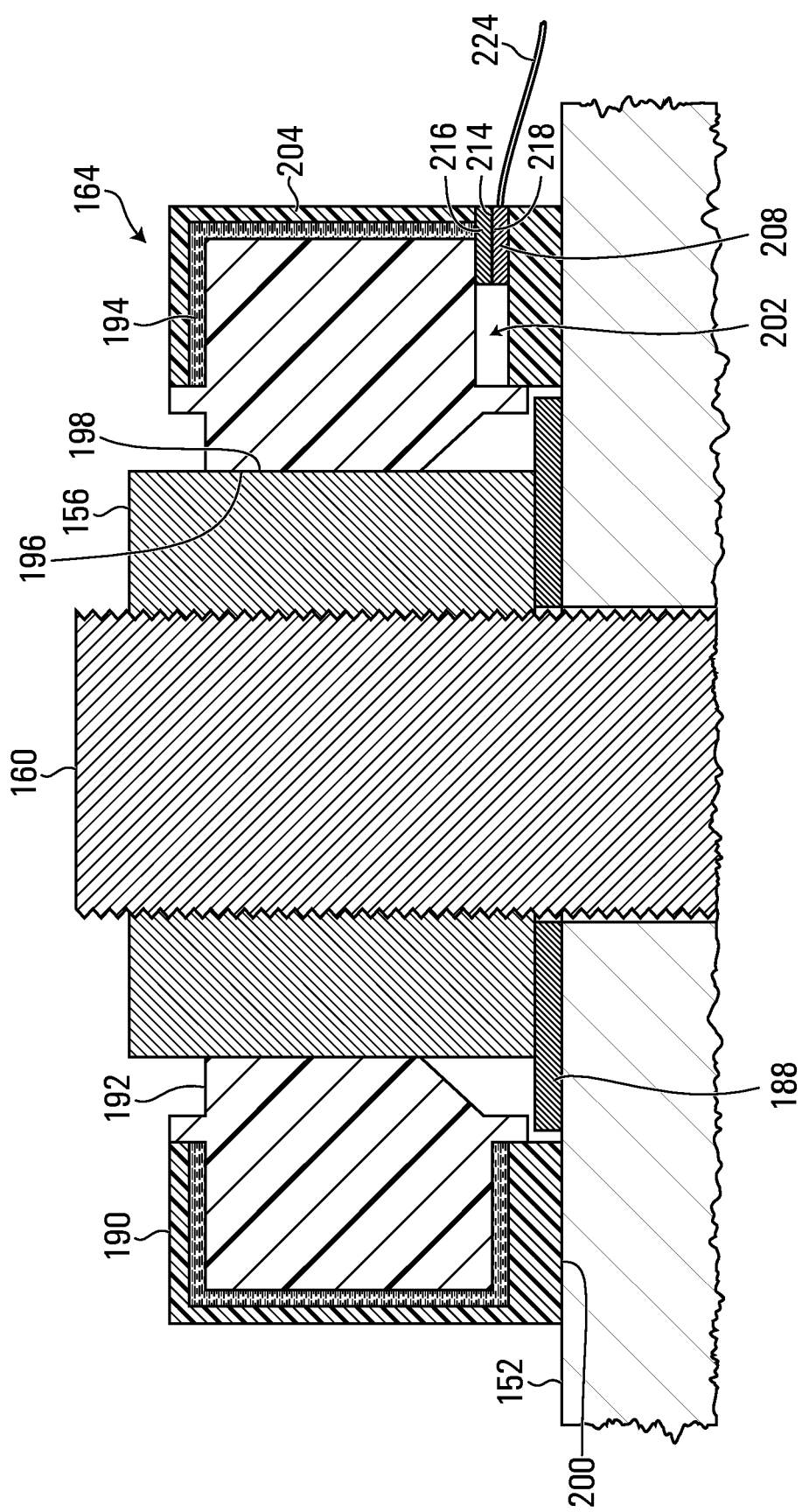
FIG. 5 is a cross-sectional view of the sensor assembly of FIG. 4, taken along the line V-V in FIG. 4.

Referring to FIGS. 4 and 5, a nut washer 188 is positioned between the nut 156 and the mounting flange 152, and the nut 156 may more generally be referred to as a fastener that is rotatable relative to the mounting flange 152. The sensor assembly 164 includes a generally cylindrical housing 190, and an interface 192. The housing 190 and the interface 192 in the embodiment shown are formed of an electrically insulating thermoplastic material. The housing 190 defines a generally annular inward-facing cavity in which the interface 192 is positioned and held for rotation therein. In the embodiment shown, a narrow space between the housing 190 and the interface 192 is filled with an electrically insulating lubricant 194.

The interface 192 is generally annular and has an inner surface 196 generally complementary to a hexagonal outer surface 198 of the nut 156. The inner surface 196 is sized to fit tightly on the outer surface 198 such that the interface 192 rotates with the nut 156 around the bolt 160. A bottom surface 200 of the housing 190 is fixed on the mounting flange 152 such that the housing remains stationary relative to the mounting flange 152 and does not rotate around the bolt 160 even if the nut 156 does rotate around the bolt 160.

Figure 6:
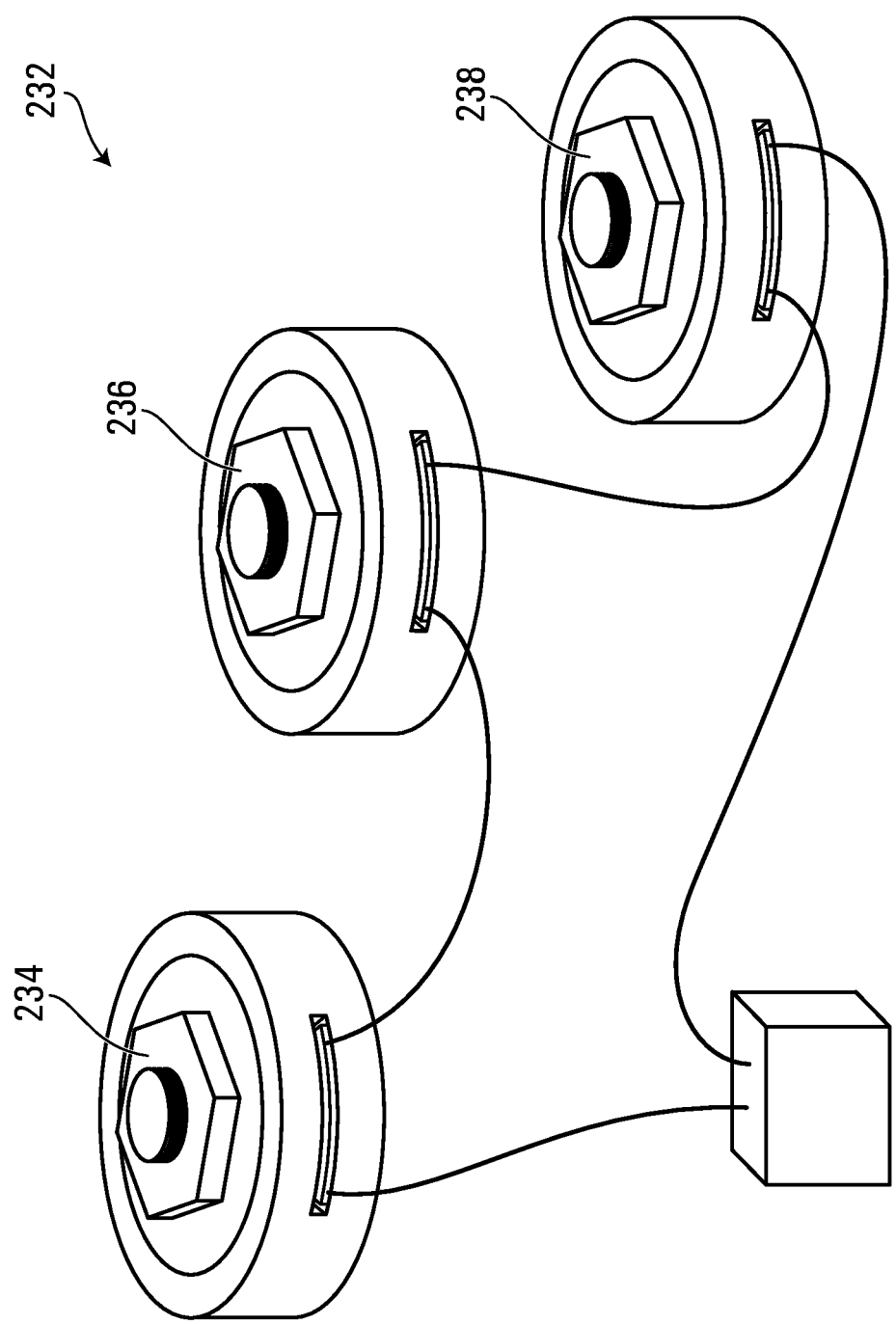
FIG. 6 is an oblique view of an another illustrative sensor assembly.

The housing 190 and the interface 192 define a cavity 202 therebetween that is open at a peripheral outer surface 204 of the housing 190. In the cavity 202, the housing 190 is coupled to first and second electrical conductors 206 and 208 spaced apart by a peripheral spacing distance 210 and having respective contact surfaces 212 and 214 facing into the cavity 202 and towards the interface 192. Also in the cavity 202, the interface 192 is coupled to a third electrical conductor 216 having a contact surface 218 facing into the cavity 202 and towards the first and second electrical conductors 206 and 208. The third electrical conductor 216 has a peripheral width 220 greater than the peripheral spacing distance 210. In the embodiment shown, the contact surfaces 212, 214, and 218 are all generally in a common plane such that rotation of the interface 192 in the inward-facing cavity of the housing 190 causes the contact surface 218 of the third electrical conductor 216 to slide in a peripheral direction over one or both of the contact surfaces 212 and 214 of the first and second electrical conductors 206 and 208. Thus it is possible to rotate the interface 192 in the housing 190 such that the contact surface 218 contacts both of the contact surfaces 212 and 214, as shown in FIGS. 5 and 6. Thus in the embodiment shown in FIGS. 5 and 6, the first, second, and third electrical conductors 206, 208, and 216 are all in electrically conductive communication, and electric current can flow therebetween.

The first electrical conductor 206 is electrically connected to a first electrically conductive lead 222, and the second electrical conductor 208 is electrically connected to a second electrically conductive lead 224. The first and second electrically conductive leads 222 and 224 are connected to a current detector 226, which detects whether current can pass from one of the first and second electrically conductive leads 222 and 224 to the other, through the first, second, and third electrical conductors 206, 208, and 216.

In one embodiment, the nut 156 may be tightened on the bolt 160 and on the nut washer 188 to a desired tightness, such as to a desired torque using a torque wrench, for example, and the nut 156 may be considered to be in a desired position when tightened to such a desired tightness, or more generally the nut 156 may be considered to be in a first position. The sensor assembly 164 may then be positioned on the mounting flange 152 such that the a bottom surface 200 of the housing 190 is fixed on the mounting flange 152 and the first, second, and third electrical conductors 206, 208, and 216 are all in electrically conductive communication. The current detector 226 can thus detect current between the first and second electrically conductive leads 222 and 224.

However, the nut 156 may become loose, or otherwise move relative to the mounting flange 152 to an undesired position (or more generally, a second position) different from the desired (or first) position mentioned above, and thereby rotate about the bolt 160. In the embodiment shown, such rotation of the nut 156 causes substantially equivalent rotation of the interface 192 relative to the housing 190, which causes the contact surface 218 of the third electrical conductor 216 to slide in a peripheral direction over the contact surfaces 212 and 214 of the first and second electrical conductors 206 and 208. If the interface 192 rotates a sufficient amount relative to the housing 190, then the third electrical conductor 216 will become spaced apart from one of the first and second electrical conductors 206 and 208, and thus electrical communication between the first and second electrically conductive leads 222 and 224 becomes broken. The first, second, and third electrical conductors 206, 208, and 216 thus function as a contact bridge having a conductivity that may vary in response to a position of the interface 192 relative to the housing 190, and thus a conductivity that varies in response to movement of the nut 156 relative to the bolt 160. Part of the contact bridge (the first and second electrical conductors 206 and 208) is held by the housing 190, and part of the contact bridge (the third electrical conductor 216) is held by the interface 192. However, in alternative embodiments, the contact bridge may be reversed such that the first and second electrical conductors 206 and 208 are held by the interface 192, and the third electrical conductor 216 is held by the housing 190. Therefore, more generally, the contact bridge has first and second sides, one of the first and second sides of the contact bridge includes the first and second electrical conductors 206 and 208, and the other one of the first and second sides of the contact bridge includes the third electrical conductor 216.

As indicated above in the embodiment shown, the interface 192 holds one side of the contact bridge, and also rotates with the nut 156 around the bolt 160, and thus the interface 192 may be referred to as a connector that connects a first side of a contact bridge to a fastener (the nut 156 in the embodiment shown) for movement in response to movement of the fastener.

Also, as indicated above in the embodiment shown, the housing 190 holds one side of the contact bridge, and is also fixed on the mounting flange 152 such that the housing remains stationary relative to the mounting flange 152 and does not rotate around the bolt 160 even if the nut 156 does rotate around the bolt 160, and thus the housing 190 may be referred to as a connector that connects a second side of the contact bridge to an object (the mounting flange 152 in the embodiment shown) to remain stationary relative to the object.

In general, the housing 190 and the interface 192 may cooperate to change a conductivity measurable by the current detector 226 in response to loosening of the nut 156 from relatively tightened position, and thus in general the housing 190 and the interface 192 may function as an apparatus to detect if the nut 156 moves from a desirable position (the relatively tightened position in the embodiment shown) to an undesirable position (a relatively loosened position in the embodiment shown) relative to an object (the mounting flange 152 in the embodiment shown).

The first, second, and third electrical conductors 206, 208, and 216 may be made of any conductive material, and in some embodiments may include magnetic materials or conductive magnetic materials to urge magnetically the third electrical conductor 216 against the first and second electrical conductors 206 and 208, thereby enhancing contact between the first, second, and third electrical conductors 206, 208, and 216 when the interface 192 is positioned in the housing 190 such that the third electrical conductor 216 is proximate the first and second electrical conductors 206 and 208.

The first and second electrical conductors 206 and 208 include respective safety nubs 228 and 230 projecting from the contact surfaces 212 and 214 respectively. The safety nubs 228 and 230 extend into the path of the third electrical conductor 216 and may limit rotation of the interface 192 within the housing 190. In some embodiments, the peripheral width 220 may exceed the peripheral spacing distance 210 by a sufficient amount such that if the housing 190 is in a predetermined position and the nut 156 is tightened to a desired position, the interface 192 may be positioned to receive the nut 156 such that the first, second, and third electrical conductors 206, 208, and 216 are all in electrically conductive communication. For example, in one embodiment, the peripheral width 220 may exceed the peripheral spacing distance 210 by a sufficient amount such that the first, second, and third electrical conductors 206, 208, and 216 remain in electrically conductive communication when the interface 192 is rotated within the housing 190 by at least an appropriate angle such as 45° or 60°, for example. The embodiment shown therefore permits some movement of the nut 156 relative to the bolt 160 before conductivity across the contact bridge is lost, thereby permitting the sensor assembly 164 to be positioned on the nut 156, with the electrical conductors 206, 208, and 216 in electrically conductive communication, regardless a particular orientation that the nut 156 may have when the nut 156 is tightened. In other words, in the embodiment shown, the third electrical conductor 216 is positionable to contact the first and second electrical conductors 206 and 208 when the nut 156 is in a first position, and the third electrical conductor 216 is spaced apart from at least one of the first and second electrical conductors 206 and 208 when the nut 156 is in a second position different from the first position.

Other embodiments may include single contact points instead of a contact bridge, thereby permitting less movement before detecting a loose nut, and still other embodiments may include contact bridges designed to permit a predetermined amount of movement before detecting a loose nut.

Also, although the sensor assembly 164 in the embodiment shown is adapted for the six-sided hexagonal nut 156, one skilled in the art will appreciate that the sensor assembly 164 may be varied for other rotatable fasteners such as rotatable four- or five-sided nuts, or linearly movable fasteners such as pins, for example. More particularly, one skilled in the art will appreciate that the dimensions of the housing 190 and of the interface 192, and the dimensions of the first, second, and third electrical conductors 206, 208, and 216 and spacings therebetween, may be selected for particular fasteners, whether rotatable or otherwise, such that the third electrical conductor 216 is positionable to contact the first and second electrical conductors 206 and 208 when the particular fastener is in a first position, and the third electrical conductor 216 is spaced apart from at least one of the first and second electrical conductors 206 and 208 when the particular fastener is in a second position different from the first position.

The current detector 226 can detect a reduction in conductivity between the first and second electrically conductive leads 222 and 224 resulting from rotation of the interface 192 within the housing 190, and the current detector 226 can thereby detect loosening of the nut 156 on the bolt 160. More generally, the sensor assembly 164 may thus detect a position of the nut 156 in the wind turbine 102, and the nut 156 may also more generally be referred to as an element of the wind turbine 102. The sensor assembly 166 is substantially the same as the sensor assembly 164.

In summary, the embodiment shown includes an electrical conductor having conductivity that changes in response to movement, such as loosening, of a nut. It will be appreciated that in alternative embodiments, such movement need not be rotational, but an alternative embodiment could detect linear motion. Alternative embodiments also need not be limited to fasteners, but could more generally detect movement of elements in response to changes of conductivity associated with such movements.

In the embodiment shown, the sensor assembly 164 may be referred to as a "single nut" sensor assembly because the sensor assembly 164 only detects a position of a single nut. However, referring to FIG. 6, a sensor assembly shown generally at 232 according to an alternative illustrative embodiment is coupled to three nuts 234, 236, and 238. The sensor assembly 232 includes, for each of the nuts 234, 236, and 238, a housing, interface, and contact bridge substantially as described above. However, the leads of the contact bridges are electrically connected in a series circuit with a current detector 240 that is substantially the same as the current detector 226. Therefore, if any one of the nuts 234, 236, and 238 becomes loose or otherwise moves sufficiently to break its respective contact bridge, the current detector 240 will detect a reduction in conductivity and will thus detect the loose nut.

The sensor assemblies 164 and 232 are not limited to fasteners in wind turbines, but may be applied to fasteners such as nuts in a large variety of applications, such as nuts on vehicle tires or other elements of machinery, for example. Further, one of the sensor assemblies 164 and 232 may be mounted on a substrate to maintain the apparatuses in a convenient single installable or replaceable unit.

Referring back to FIG. 3, in the embodiment shown, the wind turbine 102 also includes an ambient air temperature sensor assembly 168 on the inner surface 154 of the nacelle 110. The ambient air temperature sensor assembly 168 in the embodiment shown is at a position in the wind turbine 102 to measure temperature at a point spaced apart from the single-point lubricator apparatuses 122, 130, 142, and 150.

The wind turbine 102 is exemplary only, and alternative embodiments may include numerous variations, such as alternatives to the gears 134 and 136, alternative means for rotating the nacelle 110 about the yaw axis, and alternative fasteners to the nuts 156 and 158, for example. Further, the wind turbine may include one or more additional sensor assemblies or single-point lubricator apparatuses (not shown) proximate pitch bearings (not shown) that allow the blades 116, 118, and 120 to rotate along longitudinal axes of the blades to adjust pitch of the blades, or proximate pinion gears (not shown) in ring gears (not shown) of the blades 116, 118, and 120 that can be rotated by motors (not shown) to cause such pitch adjustment of the blades, for example.

Figure 7:
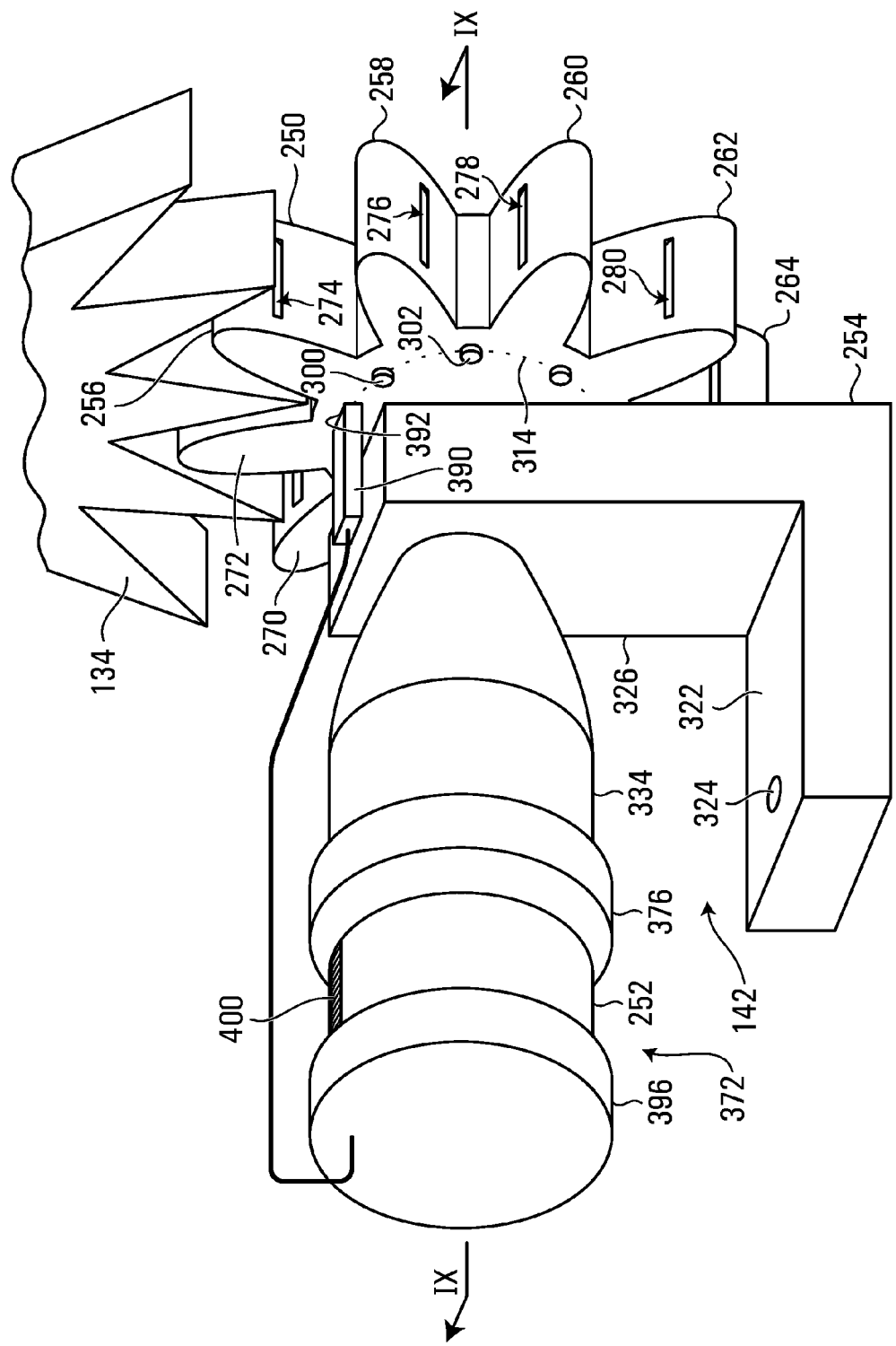
FIG. 7 is an enlarged oblique view of a single-point lubricator apparatus of the wind turbine of FIG. 2.

Referring to FIG. 7, the single-point lubricator apparatus 142 in the embodiment shown includes a lubricant applicator 250, a lubricant dispenser 252, and a mounting bracket 254.

Figure 8:
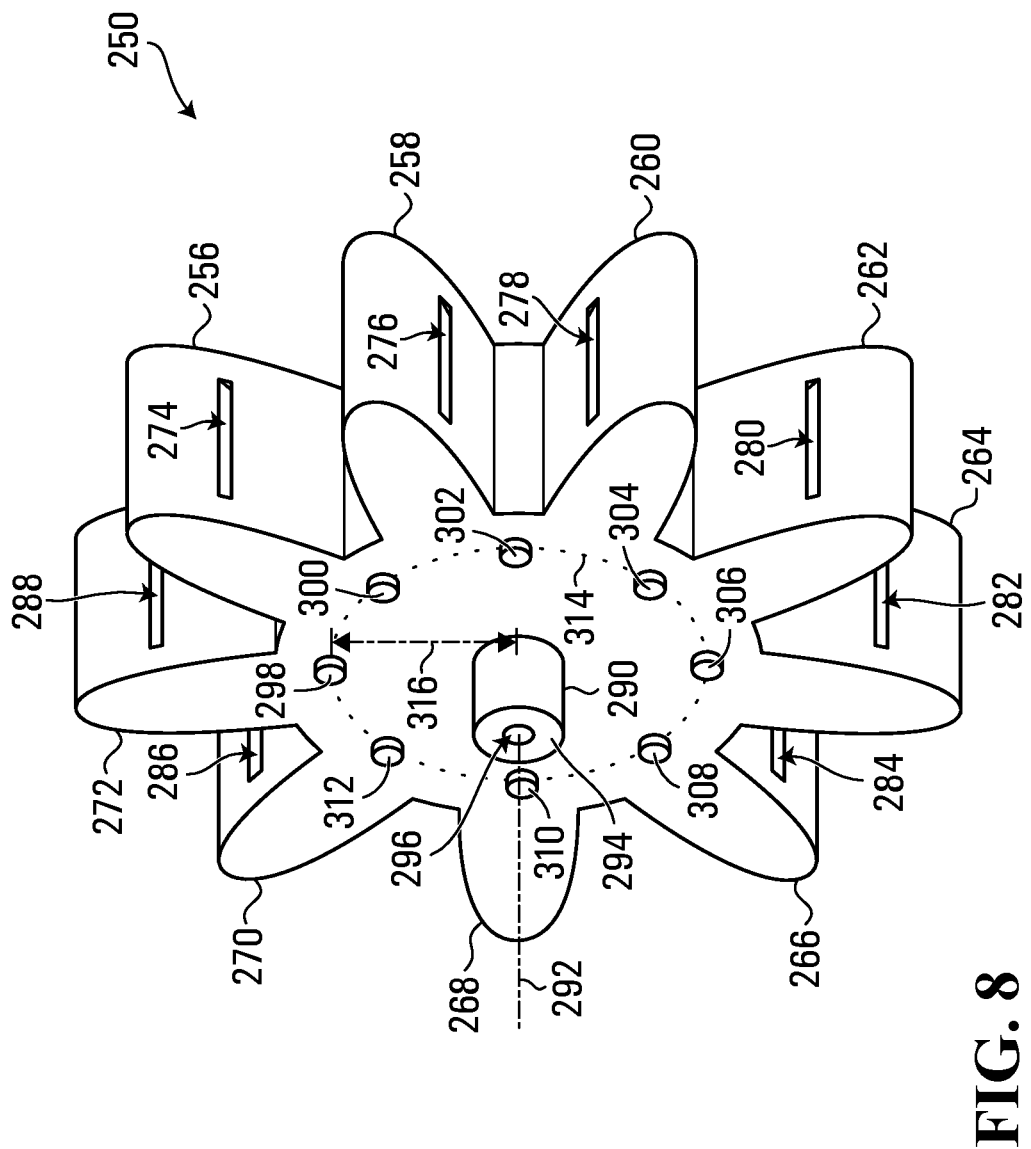
FIG. 8 is an oblique view of a lubricant applicator of the single-point lubricator apparatus of FIG. 7.

Referring to FIGS. 7 and 8, the lubricant applicator 250 in the embodiment shown is generally gear-shaped, and thus has a plurality of gear teeth including nine gear teeth 256, 258, 260, 262, 264, 266, 268, 270, and 272, each of which has opposite lateral surfaces (each facing such a lateral surface of an adjacent gear tooth of the lubricant applicator 250) for contacting working surfaces on teeth of the gear 134 (shown in FIGS. 2 and 7) when the teeth of the gear 134 are received in respective spaces between adjacent gear teeth of the lubricant applicator 250.

Opposite lateral surfaces of the gear teeth 256, 258, 260, 262, 264, 266, 268, 270, and 272 of the lubricant applicator 250 define fluid outlets, such as the fluid outlets shown generally at 274, 276, 278, 280, 282, 284, 286, and 288 in the gear teeth 256, 258, 260, 262, 264, 266, 270, and 272 respectively; in the embodiment shown, such fluid outlets contact the working surfaces on various teeth of the gear 134 when those teeth of the gear 134 are received in respective spaces between adjacent gear teeth of the lubricant applicator 250 to facilitate application of lubricant from the fluid outlets to the working surfaces on the teeth of the gear 134.

Referring to FIG. 8, in the embodiment shown, the lubricant applicator 250 also includes a generally cylindrical projection 290 centered on an axis of rotation 292 of the lubricant applicator 250. The projection 290 permits the lubricant applicator 250 to be mounted for rotation about the axis of rotation 292, and the lubricant applicator 250 is generally rotationally symmetric about the axis of rotation 292. At a distal end 294, the projection 290 defines a fluid inlet, shown generally at 296, which is in fluid communication with the fluid outlets on the gear teeth 256, 258, 260, 262, 264, 266, 268, 270, and 272 of the lubricant applicator 250 (including the fluid outlets 274, 276, 278, 280, 282, 284, 286, and 288 shown in FIG. 8).

Because the teeth of the gear 134 are engaged in the teeth of the lubricant applicator 250, rotation of the gear 134 causes rotation of the lubricant applicator 250 about the axis of rotation 292, and thus the lubricant applicator 250 may be referred to as an "idler gear" and may be said to be "engageable for rotation about the axis of rotation 292" with the gear 134, which may more generally be referred to as an "object to be lubricated".

Still referring to FIG. 8, the lubricant applicator 250 in the embodiment shown also has eight magnetic elements 298, 300, 302, 304, 306, 308, 310, and 312, each having a respective magnetic field. The magnetic elements 298, 300, 302, 304, 306, 308, 310, and 312 are positioned around the projection 290, on a same side of the lubricant applicator 250 as the projection 290, and are generally evenly spaced apart from each other along the circumference of a circle 314 centered on the axis of rotation 292 and having a radius 316. Although the embodiment shown includes eight magnetic elements 298, 300, 302, 304, 306, 308, 310, and 312, alternative embodiments may include more or fewer magnetic elements, or even a single magnetic element for example.

Figure 19:
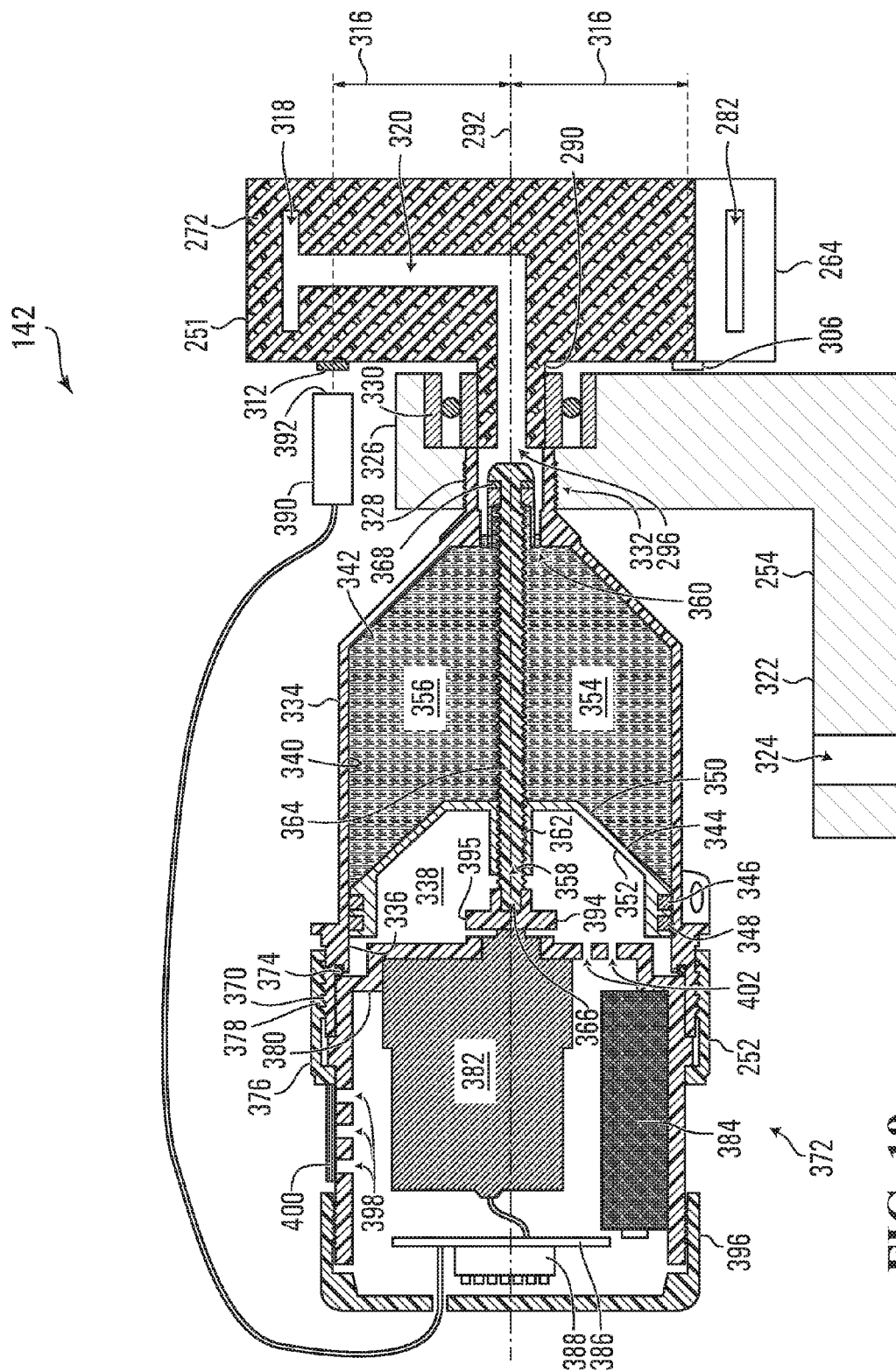
FIG. 19 illustrates the cross-sectional view of the single-point lubricator apparatus of FIG. 9 but with a sponge lubricant applicator.

In the embodiment shown, the lubricant applicator 250 is metallic, and may include one of many known metals for example. The lubricant applicator 250 in the embodiment shown is a non-ferrous metal to facilitate the detection of the magnetic fields of the magnetic elements 298, 300, 302, 304, 306, 308, 310, and 312. However, in alternative embodiments, the lubricant applicator 250 may include polyethylene sponge or an alternative sponge material, for example FIG. 19 illustrates the single-point lubricator apparatus 142 with a polyethylene-sponge lubricant applicator 251 instead of the lubricant applicator 250.

Figure 9:
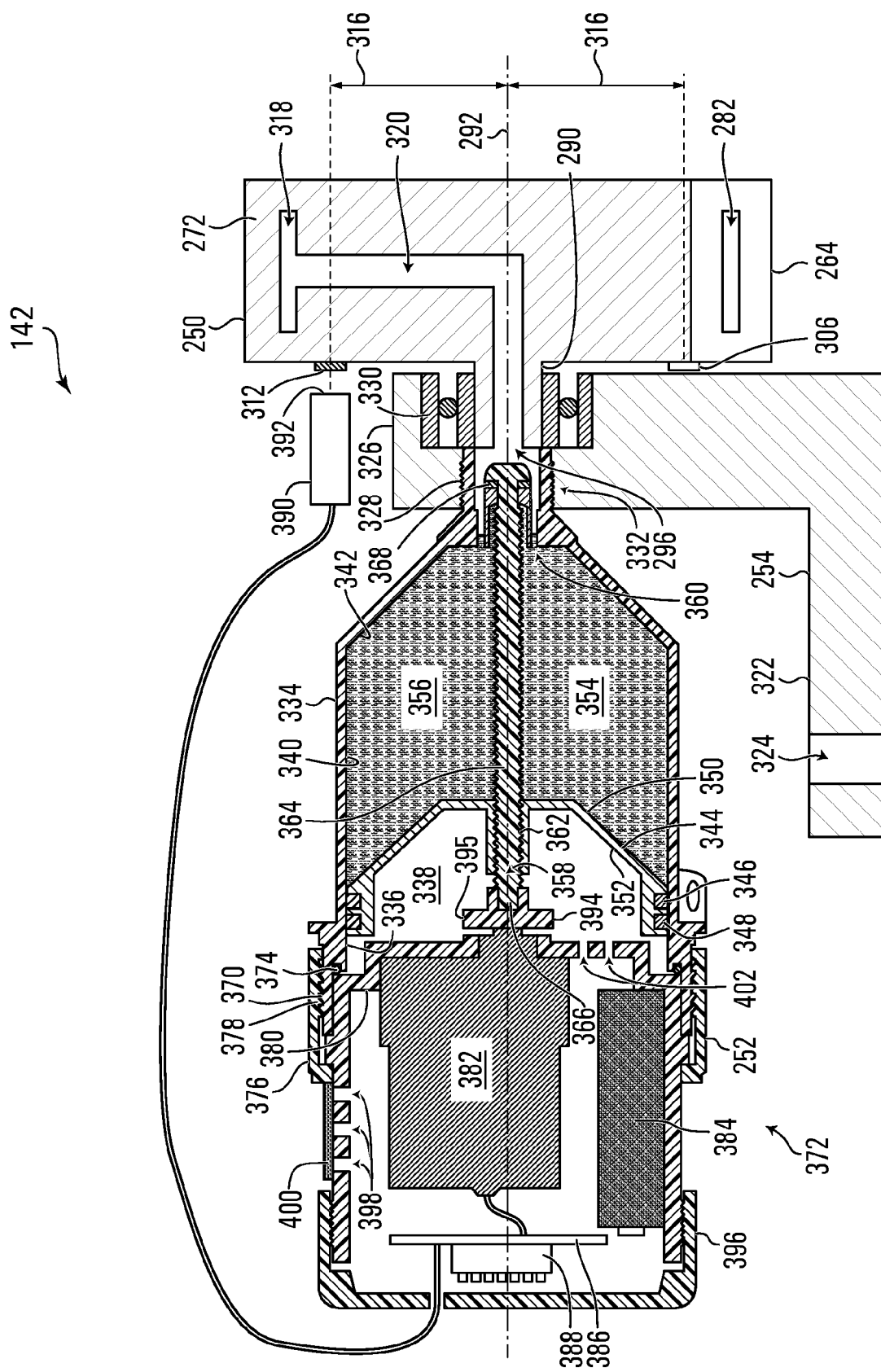
FIG. 9 is a cross-sectional view of the single-point lubricator apparatus of FIG. 7 taken along the line IX-IX in FIG. 7.

Referring to FIGS. 8 and 9, the gear tooth 272 also defines a fluid outlet shown generally at 318 in a lateral surface of the gear tooth 272 opposite the lateral surface of the fluid outlet 288. A fluid conduit shown generally at 320 extends between the fluid inlet 296 and the fluid outlets 288 and 318 such that the fluid outlets 288 and 318 are in fluid communication with the fluid inlet 296. More generally, various fluid conduits (including the fluid conduit 320 and others not shown) communicate fluid received at the fluid inlet 296 to the various fluid outlets on the gear teeth 256, 258, 260, 262, 264, 266, 268, 270, and 272 of the lubricant applicator 250.

Referring to FIG. 9, the mounting bracket 254 includes a mounting flange 322 for mounting the single-point lubricator apparatus 142 on a surface, such as the inner surface 154 of the nacelle 110 (shown in FIG. 2) in the embodiment shown, for example. In the embodiment shown, the mounting flange 322 defines a through-opening shown generally at 324 to receive a fastener (not shown) such as a bolt to mount the mounting flange 322 to such a surface.

The mounting bracket 254 in the embodiment shown also includes a support portion 326 coupled to the mounting flange 322 and defining a through-opening shown generally at 328, which has a bearing 330 couplable to at least a portion of the projection 290 such that the projection 290 (and thus the lubricant applicator 250) is rotatably mountable about the axis of rotation 292 to the support portion 326. The through-opening 328 also includes a threaded portion shown generally at 332 in the embodiment shown.

Still referring to FIG. 9, the lubricant dispenser 252 in the embodiment shown includes a housing 334 having an inner surface 336 that defines a cavity 338. In the embodiment shown, the inner surface 336 includes a cylindrically shaped sliding portion 340 and a generally frustoconical terminating portion 342. A piston 344 is positioned in the cavity 338 in slidable engagement with the sliding portion 340 of the inner surface 336. The piston 344 in the embodiment shown includes sealing members such as o-rings 346 and 348. The piston 344 also has a first surface 350 and a second surface 352 opposite the first surface 350, and the piston 344 is positioned in the cavity 338 such that the first surface 350 and the inner surface 336 define a fluid chamber 354. In the embodiment shown, the fluid chamber 354 holds a fluid, such as a lubricant 356. The piston 344 also defines a threaded opening shown generally at 358 and extending between the first surface 350 and the second surface 352.

The housing 334 defines at least one fluid outlet shown generally at 360, and in the embodiment shown, the fluid chamber 354 is open only at the at least one fluid outlet 360. The embodiment shown includes four fluid outlets 360, although alternative embodiments may include different numbers of fluid outlets 360. Also, in the embodiment shown, the housing defines external threads that surround the at least one fluid outlet 360 and that are threadably receivable in the threaded portion 332 of the through-opening 328 to couple the housing 334 to the mounting bracket 254 as shown in FIG. 9 such that the at least one fluid outlet 360 (and thus more generally the lubricant dispenser 252) is in fluid communication with the through-opening 328, and thus with the fluid inlet 296 and with the fluid outlets on the gear teeth 256, 258, 260, 262, 264, 266, 268, 270, and 272 of the lubricant applicator 250 to dispense lubricant to working surfaces of the gear 134 (shown in FIGS. 2 and 7) through the lubricant applicator 250.

The lubricant dispenser 252 also includes a threaded shaft 362, which in the embodiment shown is in sealed threaded engagement with the threaded opening 358 of the piston 344. The threaded shaft 362 includes a first portion 364 extending out of the first surface 350 and into the fluid chamber 354, and a second portion 366 extending out of the second surface 352 and away from the fluid chamber 354. The second portion 366 in the embodiment shown is configured to be detachably coupled to a drive member for applying a torque on the threaded shaft 362. The first portion 364 of the threaded shaft 362 is rotatably coupled to the housing 334 for rotation in the threaded opening 358 of the piston 344. In the embodiment shown, a thrust bearing 368 is positioned between the fluid outlets 360 and is supported by the housing 334 to permit rotation of the threaded shaft 362. The thrust bearing 368 may be a washer manufactured from DUPONT™ DELRIN™, for example.

When the piston 344 slides along the sliding portion 340 of the inner surface 336, the first surface 350 of the piston 344 exerts a force on the lubricant 356 in the fluid chamber 354, thereby urging the lubricant 356 out of the at least one fluid outlet 360. Therefore, in operation of the embodiment shown, rotation of the threaded shaft 362 causes the threaded shaft 362 to exert a force on the housing 334 and on the piston 344 to urge the piston 344 towards the terminating portion 342 of the inner surface 336, thereby urging the lubricant 356 out of the fluid chamber 354 through the at least one fluid outlet 360. Pressure exerted by the lubricant 356 on the first surface 350 of the piston 344 results in a thrust force on the threaded shaft 362. In the embodiment shown, the first surface 350 of the piston 344 is generally complementary to the terminating portion 342, which may enable the first surface 350 to force substantially all of the lubricant 356 out of the fluid chamber 354.

In the embodiment shown, the housing 334 includes an externally threaded surface 370 for threaded engagement with a drive assembly shown generally at 372, and a sealing member such as an o-ring 374 for sealing the cavity 338 from the outside when the housing 334 is coupled to the drive assembly 372. In the embodiment shown, the drive assembly 372 includes a ring 376 having an internally threaded surface 378 for threadably engaging the externally threaded surface 370 of the housing 334, and the externally threaded surface 370 engages the internally threaded surface 378 to urge the o-ring 374 against a lower surface 380 of the drive assembly 372 to seal the cavity 338 from the outside.

In the embodiment shown, the drive assembly 372 includes a drive motor 382 powered by a battery pack 384 and controlled by a processor circuit 386, which is in communication with a dual in-line package ("DIP") switch assembly 388 having various switches that may be used to configure various parameters of the drive assembly 372.

The processor circuit 386 is also in communication with a detector 390 that is positioned approximately a distance of the radius 316 from the axis of rotation 292 of the lubricant applicator 250 and proximate the side of the lubricant applicator 250 having the magnetic elements 298, 300, 302, 304, 306, 308, 310, and 312 (shown in FIG. 8), and therefore the magnetic elements 298, 300, 302, 304, 306, 308, 310, and 312 move proximate the detector 390 as the lubricant applicator 250 rotates about the axis of rotation 292. More generally, the magnetic elements 298, 300, 302, 304, 306, 308, 310, and 312 move proximate a reference point 392, which in the embodiment shown is a region of the detector 390 configured to detect magnetic fields, and the detector 390 is thus configured to detect the magnetic elements 298, 300, 302, 304, 306, 308, 310, and 312 when the magnetic elements move proximate the reference point 392 in response to rotation of the lubricant applicator 250 about the axis of rotation 292. Further, the detector 390 is held to remain stationary relative to the mounting bracket 254 when the lubricant applicator 250 rotates about the axis of rotation 292, and therefore the reference point 392 also remains stationary relative to the mounting bracket 254 when the lubricant applicator 250 rotates about the axis of rotation 292.

In alternative embodiments, the magnetic elements may be replaced with other elements that may be detected by a detector, and therefore the magnetic elements may be referred to more generally as "detectable elements". However, in the embodiment shown, the detector 390 detects the magnetic elements, and the detector 390 may include one or more known magnetometers, such as a Hall probe or more generally a Hall Effect sensor, for example. The detector 390 in the embodiment shown generates a signal in response to detection proximate the reference point 392 of at least one of the magnetic elements 298, 300, 302, 304, 306, 308, 310, and 312. Such a signal represents rotation of the lubricant applicator 250 about the axis of rotation 292, and therefore the detector 390 generates a signal representing rotation of the lubricant applicator 250. The processor circuit 386 receives such signals from the detector 390.

The processor circuit 386 is also in communication with the drive motor 382, which is coupled to the second portion 366 of the threaded shaft 362 by a cam coupling 394 that defines a recess to receive at least a portion of the second portion 366 such that the drive motor 382 can apply a torque to the second portion 366. The cam coupling 394 in the embodiment shown has a trigger 395 for triggering a limit switch (not shown) to count rotations of the cam coupling 394. It will be appreciated that by counting revolutions of the cam coupling 394, an estimate may be calculated of the distance through which the piston 344 has traveled along the sliding portion 340, such that an estimate may be calculated of a volume of the lubricant 356 that has been urged out of the fluid chamber 354 through the at least one fluid outlet 360. However, alternatively, processor circuit 386 may employ a timing function to estimate a volume of the lubricant 356 that has been urged out of the fluid chamber 354 through the at least one fluid outlet 360 based on a duration of time during which the cam coupling 394 is rotated.

The drive assembly 372 also includes a threaded cap 396 for covering the internal components of the drive assembly 372. The drive assembly may, in some embodiments, include a temperature sensor (not shown), and in such embodiments the processor circuit 386 may be configured to deliver a greater amount of the lubricant 356 when an object to be lubricated is at a higher temperature, for example.

The housing of the drive assembly 372 in the embodiment shown defines a plurality of openings shown generally at 398 to permit air circulation in and through the inside of the drive assembly 372. The openings 398 may be covered with a breathable material 400, such as DUPONT™ TYVEK™, for example, in order to permit air to enter the inside of the drive assembly 372 while preventing dust and other particles from entering the inside of the drive assembly 372. In the embodiment shown, the housing of the drive assembly 372 also includes one or more openings shown generally at 402 to permit air from the inside of the drive assembly 372 to circulate in and out of the cavity 338, for example to prevent a vacuum from forming in the cavity 338 when the piston 344 moves in a direction to expel the lubricant 356 from the fluid chamber 354. For example, the lubricant dispenser 252 may include elements of the lubricant dispenser known as a JACK LUBER™ lubricant dispenser available from A.T.S. Electro-Lube International Inc. of Delta, British Columbia, Canada. United States patent publication no. 2010/0217446 to Orlitzky et al. (incorporated by reference herein in its entirety) also describes some aspects of a lubricant dispenser similar to the lubricant dispenser 252.

Figure 10:
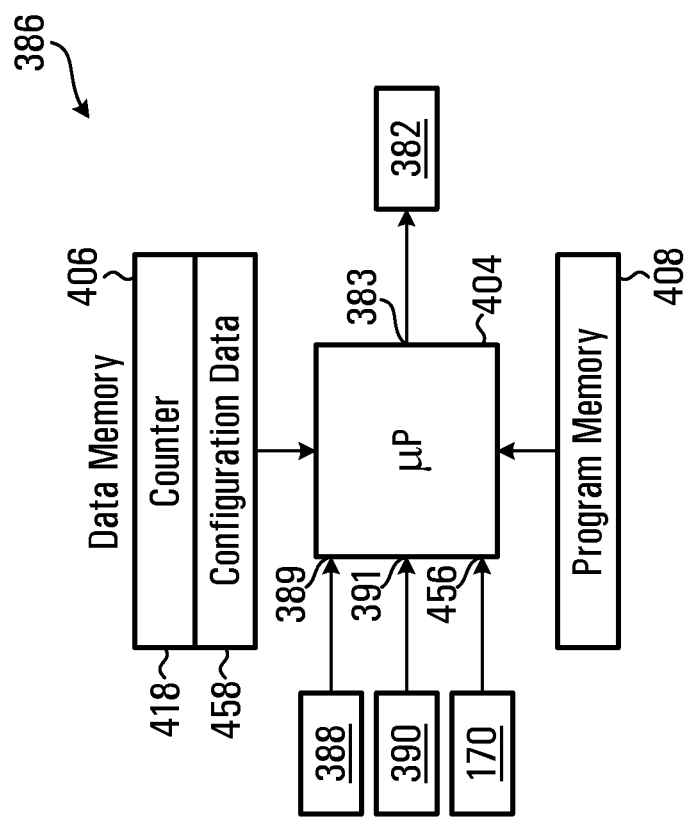
FIG. 10 is a schematic illustration of a processor circuit of the single-point lubricator apparatus of FIG. 7.

Referring to FIG. 10, the processor circuit 386 is illustrated schematically, and includes a microprocessor 404, and a data memory 406 and a program memory 408 in communication with the microprocessor 404. The data memory 406 may include one or more known computer-readable and computer-writable memories, such as random-access memory ("RAM") for example, and the program memory 408 may include one or more known computer-readable memories such as RAM or read-only memory ("ROM"), for example. The microprocessor 404 in the embodiment shown receives signals from the DIP switch assembly 388 at a DIP switch interface 389, receives signals from the detector 390 at a detector interface 391, and transmits signals to the drive motor 382 at a drive motor interface 383. One skilled in the art will appreciate that in alternative embodiments, the processor circuit 386 may include alternative circuits such as an application specific integrated circuit ("ASIC") or other known processor circuits, for example.

In the embodiment shown, the data memory 406 generally includes stores for storing data that may be stored and accessed by the microprocessor 404, and the program memory 408 generally has stored thereon instructions for directing the microprocessor 404 to carry out functions of the processor circuit 386.

Figure 11:
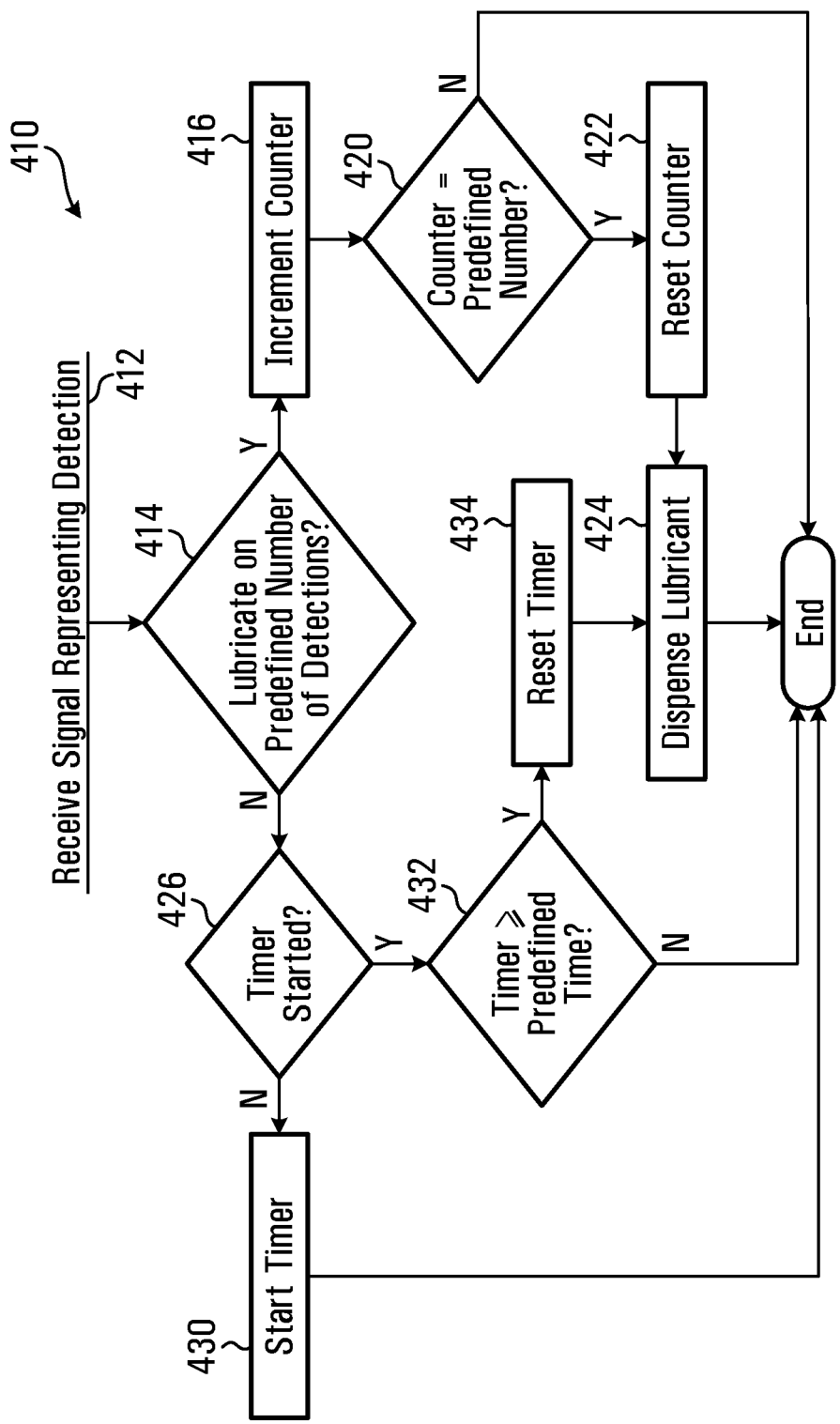
FIG. 11 is a schematic illustration of program codes in program memory of the processor circuit of FIG. 10.

Referring to FIGS. 10 and 11, the program memory 408 includes program codes 410 generally to direct the processor circuit 386 to control the single-point lubricator apparatus 142 (shown in FIGS. 2 and 7) in response to receiving a signal from the detector 390 representing rotation of the lubricant applicator 250. The program codes 410 begin at 412 in response to receiving a signal at the detector interface 391 from the detector 390 representing detection by the detector 390 of one of the magnetic elements (such as the magnetic element 312 shown in FIG. 9, for example) proximate the reference point 392 (shown in FIG. 9).

The program codes 410 continue at block 414, which in the embodiment shown includes codes for directing microprocessor 404 to determine whether one or more of the switches of the DIP switch assembly 388 are positioned to configure the lubricant dispenser 252 (shown in FIG. 9) to dispense lubricant in response to a predefined number of detections of the magnetic elements (298, 300, 302, 304, 306, 308, 310, and 312 in the embodiment shown in FIG. 8) proximate the reference point 392 (shown in FIG. 9).

If at block 414 the lubricant dispenser 252 is configured to lubricate in response to a predefined number of detections, then the program codes 410 continue at block 416, which includes codes for directing the microprocessor 404 to increment a counter value stored in a counter store 418 in the data memory 406. The counter value stored in the counter store 418 is initially set to zero in the embodiment shown.

The program codes 410 continue at block 420, which includes codes for directing the microprocessor 404 to determine whether the counter value stored in the counter store 418 equals a predefined number, which in the embodiment shown is specified by one or more of the switches of the DIP switch assembly 388. If at block 420 the counter value stored in the counter store 418 does not equal the predefined number, then the program codes 410 end.

But if at block 420 the counter value stored in the counter store 418 does equal the predefined number, then the program codes 410 continue at block 422, which includes codes for directing the microprocessor 404 to reset the counter value in the counter store 418. The program codes 410 then continue at block 424, which includes codes for directing the microprocessor 404 to cause the lubricant dispenser 252 to dispense lubricant.

Referring to FIGS. 7 to 11, in the embodiment shown, the codes at block 424 cause the processor circuit 386 to send a signal to the drive motor 382 from the drive motor interface 383 to cause the drive motor 382 to rotate the threaded shaft 362 by a predefined amount, such as a predefined number of rotations (counted in the embodiment shown as a number rotations of the cam coupling 394 counted by triggers from the limit switch trigger 395), or for a predefined period of time, either of which may be configured by one or more of the switches of the DIP switch assembly 388, for example. As described above, such rotation of the threaded shaft 362 causes lubricant 356 to be urged from the fluid chamber 354 through the at least one fluid outlet 360, and lubricant urged out of the at least one fluid outlet 360 passes through the through-opening 328, into the fluid inlet 296 of lubricant applicator 250, out of the fluid outlets of the lubricant applicator 250 such as the fluid outlets 274, 276, 278, 280, 282, 284, 286, and 288 shown in FIG. 8 for example, and onto working surfaces of the gear 134. The lubricant dispenser 252 therefore dispenses lubricant through the lubricant applicator 250 to an object to be lubricated (the gear 134 in the embodiment shown) in response to the signal received at 412. The program codes 410 then end.

In summary, where at block 414 the lubricant dispenser 252 is configured to lubricate in response to a predefined number of detections, the program codes 410 control the single-point lubricator apparatus 142 by causing the lubricant dispenser 252 of the single-point lubricator apparatus 142 to dispense lubricant through the lubricant applicator 250 to an object to be lubricated (the gear 134 shown in FIG. 7 in the embodiment shown) in response to the signal received at 412, and more particularly in response to the signal received at 412 representing a predefined number of detections of at least one of the magnetic elements (298, 300, 302, 304, 306, 308, 310, and 312 in the embodiment shown in FIG. 8) proximate the reference point 392.

Referring back to FIGS. 10 and 11, if at block 414 the lubricant dispenser 252 is not configured to lubricate in response to a predefined number of detections, then in the embodiment shown, the lubricant dispenser 252 is in an alternative configuration in which the lubricant dispenser dispenses lubricant if the lubricant applicator 250 has been rotating for at least a predefined period of time.

Therefore, if at block 414 the lubricant dispenser 252 is configured to dispense lubricant in response to rotation of the lubricant applicator 250 for at least a predefined period of time, then the program codes 410 continue at block 426, which includes codes for directing the microprocessor 404 to determine whether a timer has already started. If not, then the program codes 410 continue at block 430, which includes codes for directing the microprocessor 404 to start a timer, and the program codes 410 then end.

But if at block 426 the timer has started, then the timer has been started by a previous execution of the codes at block 430, and therefore in the embodiment shown it may be assumed that the lubricant applicator 250 is moving. The program codes 410 therefore continue at block 432, which includes codes for directing the microprocessor 404 to determine whether the time elapsed according to the timer is greater than or equal to a first predefined period of time, which may be configured by one or more of the switches of the DIP switch assembly 388.

If at block 432 the time elapsed according to the timer is not greater than or equal to the first predefined period of time, then the program codes 410 end. But if at block 432 the time elapsed according to the timer is greater than or equal to the first predefined period of time, then the program codes 410 continue at block 434, which includes codes for directing the microprocessor 404 to reset the timer, such that after execution of the codes at block 434, the timer stores an elapsed time value of zero, but the elapsed time value stored by the timer continues to increase. The program codes 410 then continue at block 424 as discussed above.

In summary and referring to FIGS. 9, 10, and 11, where at block 414 the lubricant dispenser 252 is configured to dispense lubricant in response to rotation of the lubricant applicator 250 for at least a predefined period of time, the program codes 410 control the single-point lubricator apparatus 142 by causing the lubricant dispenser 252 of the single-point lubricator apparatus 142 to dispense lubricant through the lubricant applicator 250 to an object to be lubricated (the gear 134 shown in FIG. 7 in the embodiment shown) in response to the signal received at 412, and more particularly in response to the signal received at 412 representing rotation of the lubricant applicator 250 for at least the predefined period of time.

Although the embodiment shown involves different blocks of code depending on whether at block 414 the lubricant dispenser 252 is configured to lubricate in response to a predefined number of detections, in alternative embodiments the program codes 410 may proceed both to block 416 (to cause the lubricant dispenser 252 to dispense lubricant in response to a predefined number of detections) and to block 426 (to cause the lubricant dispenser 252 to dispense lubricant in response to rotation of the lubricant applicator 250 for at least the first predefined period of time) in response to receiving a signal from the detector 390 representing rotation of the lubricant applicator 250.

Still further, in some embodiments, the lubricant dispenser 252 may dispense lubricant even in the absence of any rotation of the lubricant applicator 250. In the embodiment shown, the switches of the DIP switch assembly 388 (shown in FIG. 10) may be positioned to configure a second predefined period of time (for example 24 hours) at which the lubricant dispenser 252 may periodically dispense lubricant in the absence of any rotation of the lubricant applicator 250. By dispensing lubricant every time the second predefined period of time passes in the absence of any rotation of the lubricant applicator 250, the lubricant applicator 250 may in some embodiments ensure that lubricant remains on an object to be lubricated. In the embodiment shown, the switches of the DIP switch assembly 388 (shown in FIG. 10) may also be positioned to configure a third predefined period of time (for example two weeks, and more generally in some embodiments a period of time greater than the second predefined period of time) after which the lubricant dispenser 252 may cease dispensing lubricant in the absence of any rotation of the lubricant applicator 250. By ceasing dispensing lubricant after the third predefined period of time passes in the absence of any rotation of the lubricant applicator 250, the lubricant applicator 250 may in some embodiments avoid over-lubricating an object to be lubricated or may avoid over-consuming lubricant or battery resources of the single-point lubricator apparatus 142.

Figure 12:
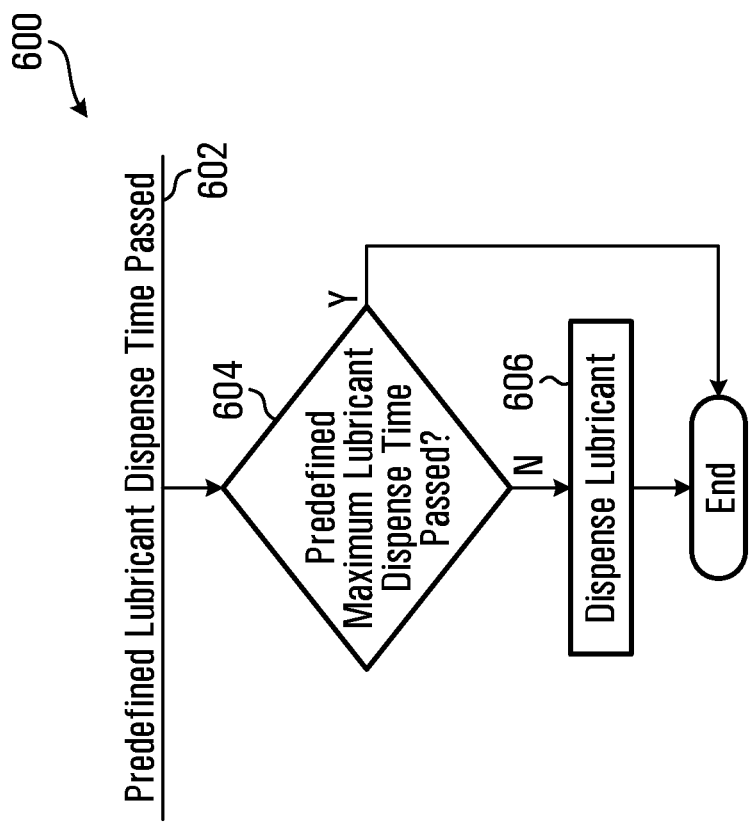
FIG. 12 is a schematic illustration of additional program codes in the program memory of the processor circuit of FIG. 10.

More particularly, referring to FIGS. 10 and 12, the program memory 408 includes program codes 600 generally to direct the processor circuit 386 to control the single-point lubricator apparatus 142 (shown in FIGS. 2 and 7) to cause the single-point lubricator apparatus 142 to dispense lubricant in response the second predefined period of time passing since a most recent of
    a) a most recent signal representing rotation of the lubricant applicator 250, and
    b) a most recent dispense of lubricant by the single-point lubricator apparatus 142 if the most recent signal representing rotation of the lubricant applicator 250 is within the third predefined period of time. The program codes 600 begin at 602 when the second predefined period of time has passed since the most recent of: the most recent signal representing rotation of the lubricant applicator 250; and the most recent dispense of lubricant by the single-point lubricator apparatus 142. The program codes 600 then continue at block 604, which includes codes for directing the microprocessor 404 to determine whether the time since the most recent signal representing rotation of the lubricant applicator 250 is greater than the third predefined period of time. If so, then the program codes 600 end. But if at block 604 the time since the most recent signal representing rotation of the lubricant applicator 250 is not greater than the third predefined period of time, then the program codes 600 continue at block 606, which includes codes for directing the microprocessor 404 to cause the lubricant dispenser 252 to dispense lubricant. The codes at block 606 may be similar to the codes at block 424 (shown in FIG. 11) as discussed above.

In alternative embodiments, the codes as block 604 may be omitted, and in such embodiments the lubricant dispenser 252 may dispense lubricant every time the second predefined period of time passes in the absence of rotation of the lubricant applicator 250 and in the absence of dispensing lubricant by the single-point lubricator apparatus 142, regardless of how much time passed since rotation of the lubricant applicator 250.

Figure 13:
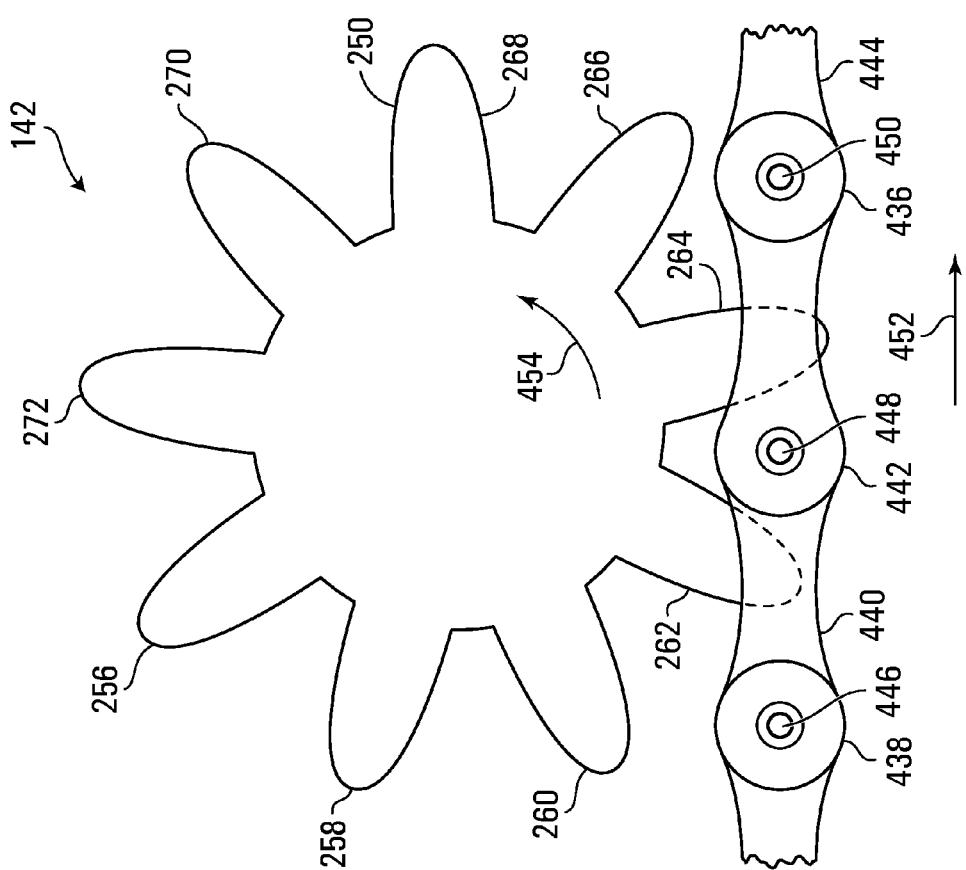
FIG. 13 is an end elevational view of the single-point lubricator apparatus of FIG. 7 in an alternative embodiment.

Referring to FIG. 13, the single-point lubricator apparatus 142 is shown in an alternative embodiment to apply lubricant to working surfaces of a chain 436, which in the embodiment shown may be referred to as an "object to be lubricated". In the embodiment shown, the chain 436 includes a plurality of chain links including the chain links 438, 440, 442, and 444 illustrated in FIG. 13. The chain links are pivotally coupled to each other, such that the chain links 438 and 440 are coupled together at a pivot 446, the chain links 440 and 442 are coupled together at a pivot 448, and the chain links 442 and 444 are coupled to each other a pivot 450. In the embodiment shown, the teeth of the lubricant applicator 250 are configured to fit in gaps between the pivots such as the pivots 446, 448, and 450 such that when the chain moves in a lateral direction such as the lateral direction of the arrow 452, the lubricant applicator 250 rotates in a rotation direction indicated by the arrow 454. Therefore, linear motion of the chain 436 causes rotation of the lubricant applicator 250, and the lubricant applicator 250 in the embodiment shown is thus in engagement for rotation about the axis of rotation 292 with the chain 436. Further, the lubricant applicator 250 in the embodiment shown may include a circumferential felt (not shown) that contacts the chain 436 to apply lubricant to the chain 436 as described in U.S. Pat. No. 5,622,239 to Orlitzky (incorporated by reference herein in its entirety), for example.

Although the single-point lubricator apparatus 142 is shown in a system including the wind turbine 102, the single-point lubricator apparatus 142 in alternative embodiments may be included in alternative systems, which may include a swing bridge or a crane, for example. In general, the single-point lubricator apparatus 142 may be advantageous in systems including objects to be lubricated (such as gears or chains, for example) that move infrequently or intermittently, thereby avoiding applying excessive lubricant when the objects to be lubricated do not move for an extended period of time, and also avoiding applying insufficient lubricant during periods of time when the objects to be lubricated move a relatively large amount.

In the embodiment shown, the single-point lubricator apparatus 150 is substantially the same as the single-point lubricator apparatus 142, and either single-point lubricator apparatus may be referred to more generally as a "lubricator apparatus". In alternative embodiments, the single-point lubricator apparatuses 122, 130, 142, and 150 may include lubricant dispensers such as an ELECTRO-LUBER™ lubricant dispenser, ULTIMATE LUBER™ lubricant dispenser, TITAN CL LUBER™ lubricant dispenser, TITAN OILER 2000™ lubricant dispenser, or JACK LUBER™ lubricant dispenser, all available from A.T.S. Electro-Lube International Inc. of Delta, British Columbia, Canada, for example. In other alternative embodiments, the single-point lubricator apparatuses 142 and 150 may include gear wheel lubricators as described in U.S. Pat. No. 5,622,239 to Orlitzky, or alternative sponge applicators, for example.

In still other alternative embodiments, the lubricator apparatuses need not be single-point lubricator apparatuses, but instead may be different lubricator apparatuses that may, for example, lubricate several locations from one lubricant holder. More generally, other embodiments may include fluid dispenser apparatuses that may be similar to the lubricator apparatuses described herein but that may include fluid holders for holding a fluid to be dispensed, and the fluids may not necessarily be lubricants. For example, in some embodiments, such fluid dispenser apparatuses may include fluid holders for holding a solvent to be dispensed, and such fluid dispenser apparatuses in some embodiments may dispense the solvent where a solvent may be desirable. For example, in one embodiment, such a solvent may be dispensed in a sewage system to dissolve oil or grease that may prevent fluid flow through pressure sensor orifices proximate sewage pumps. Therefore, although lubricator apparatuses are described herein for illustration, embodiments herein are not limited to lubricator apparatuses and may more generally include fluid dispenser apparatuses.

Figure 14:
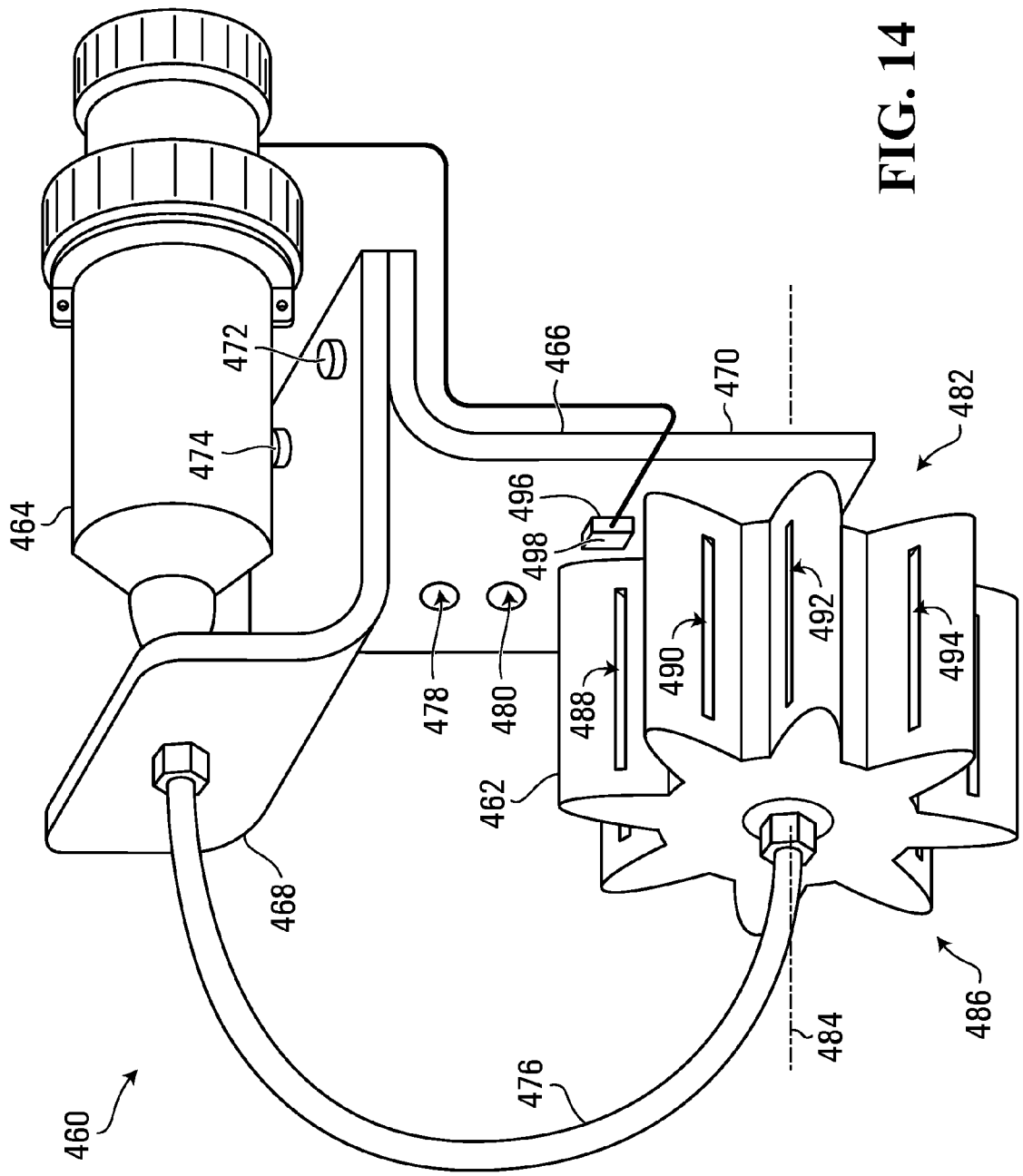
FIG. 14 is an oblique view of an alternative single-point lubricator apparatus.
Figure 15:
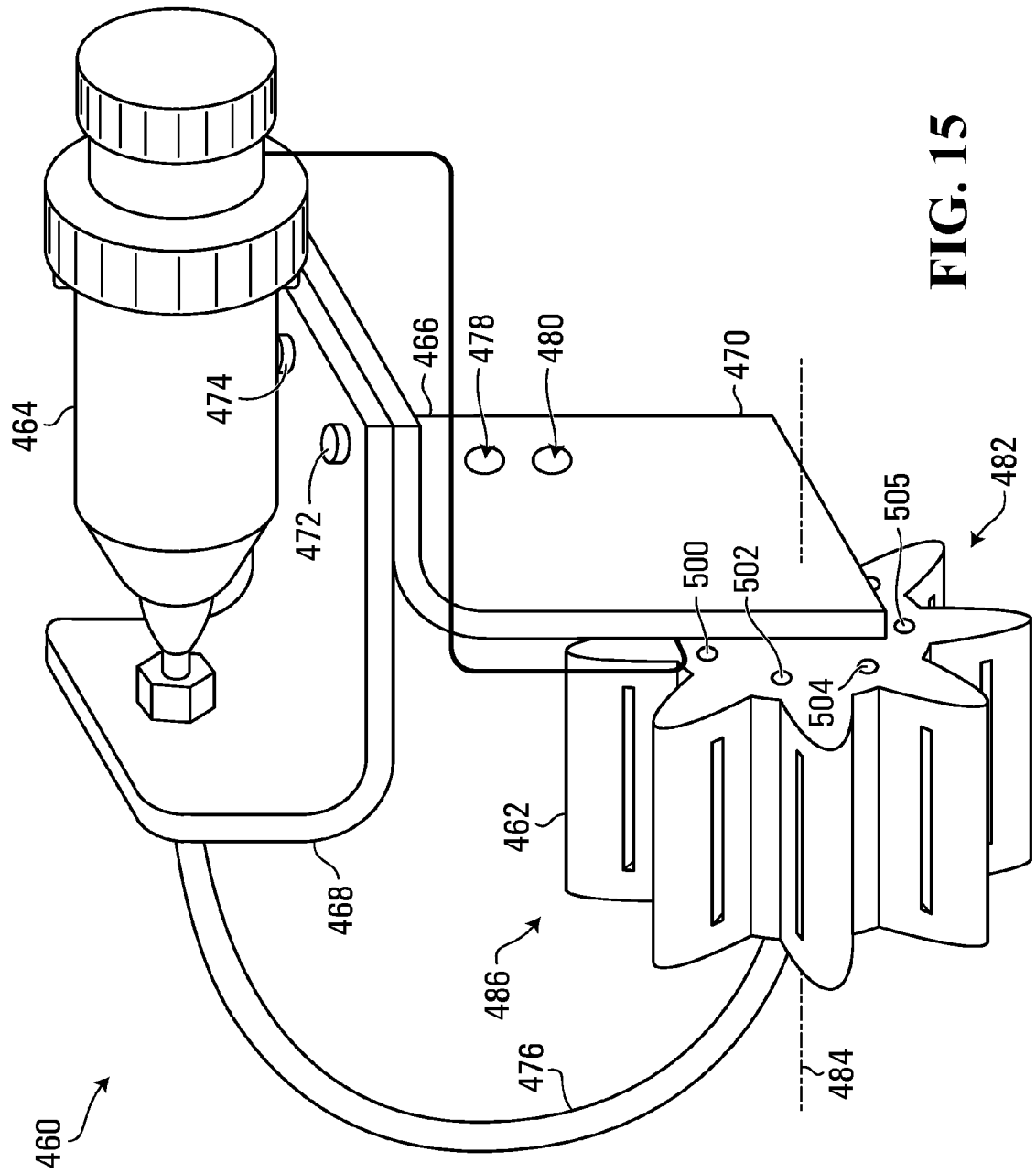
FIG. 15 is another oblique view of the single-point lubricator apparatus of FIG. 14.

Referring to FIGS. 14 and 15, an alternative single-point lubricator apparatus is shown generally at 460, and includes a lubricant applicator 462, a lubricant dispenser 464, and a mounting bracket 466. The mounting bracket 466 includes a lubricant dispenser mounting bracket 468, and a lubricant applicator mounting bracket 470 coupled to the lubricant dispenser mounting bracket 468 by fasteners 472 and 474. The lubricant dispenser mounting bracket 468 couples a fluid outlet of the lubricant dispenser 464 (similar to the at least one fluid outlet 360 shown in FIG. 9) to a fluid conduit 476, which in the embodiment shown in a fluid hose. The lubricant applicator mounting bracket 470 defines through-openings shown generally at 478 and 480 to receive respective fasteners (not shown) to mount the single-point lubricator apparatus 460 to a surface, such as the inner surface 154 of the nacelle 110 (shown in FIG. 2) for example. The lubricant applicator mounting bracket 470 also supports the lubricant applicator 462 on a first end side shown generally at 482 of the lubricant applicator 462 for rotation about an axis of rotation 484.

The lubricant applicator 462 is substantially the same as the lubricant applicator 250 (shown in FIGS. 7, 8, and 9), except that the lubricant applicator 462 in the embodiment shown receives lubricant from the fluid conduit 476 on a second end side shown generally at 486 opposite the first end side 482. The lubricant applicator 462 communicates lubricant received from the fluid conduit 476 to fluid outlets on opposite lateral sides of gear teeth of the lubricant applicator 462, such as the fluid outlets shown generally at 488, 490, 492, and 494 in FIG. 14.

The lubricant dispenser 464 is substantially the same as the lubricant dispenser 252, and may include elements of the lubricant dispenser known as a JACK LUBER™ lubricant dispenser available from A.T.S. Electro-Lube International Inc. of Delta, British Columbia, Canada. United States patent publication no. 2010/0217446 to Orlitzky et al. also describes some aspects of a lubricant dispenser similar to the lubricant dispenser 464. The lubricant dispenser 464 includes a detector 496 that is substantially the same as the detector 390 (shown in FIG. 9) and that is configured to detect magnetic fields proximate a reference point 498 and to communicate signals to a processor circuit (not shown but controls the lubricant dispenser 464 in response to signals from the detector 496 similarly to the processor circuit 386 shown in FIG. 10) of the lubricant dispenser 464.

On the first end side 482, the lubricant applicator 462 has magnetic elements including the magnetic elements 500, 502, 504, and 505 shown in FIG. 15, and the magnetic elements of the lubricant applicator 462 are substantially the same as the magnetic elements 298, 300, 302, 304, 306, 308, 310, and 312 (shown in FIGS. 7 and 8). The magnetic elements of the lubricant applicator 462 (including the magnetic elements 500, 502, 504, and 505 shown in FIG. 15) are positioned in a similar manner as the magnetic elements 298, 300, 302, 304, 306, 308, 310, and 312 (shown in FIGS. 7 and 8) to move proximate the reference point 498 in response to rotation of the lubricant applicator 462 about the axis of rotation 484. The detector 496 in the embodiment shown is held by the lubricant applicator mounting bracket 470 to remain stationary relative to the lubricant applicator mounting bracket 470 (and therefore the reference point 498 remains stationary relative to the lubricant applicator mounting bracket 470) when the lubricant applicator 462 rotates around the axis of rotation 484. The single-point lubricator apparatus 460 thus functions similarly to the single-point lubricator apparatus 142, and may replace or complement the single-point lubricator apparatus 142 (shown in FIGS. 2, 7, and 9) in alternative embodiments.

Figure 16:
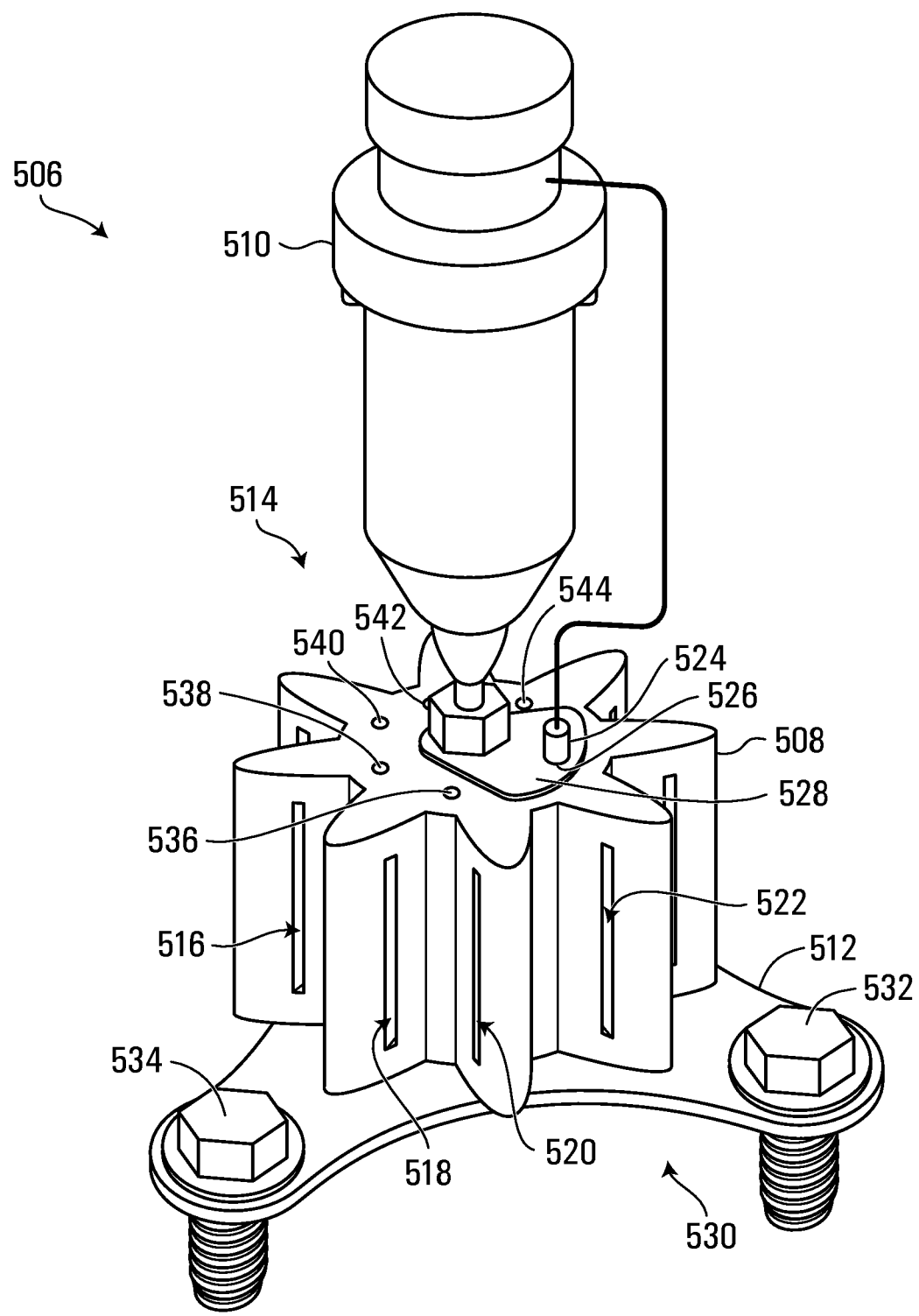
FIG. 16 is an oblique view of another alternative single-point lubricator apparatus.

Referring to FIG. 16, another alternative single-point lubricator apparatus is shown generally at 506, and includes a lubricant applicator 508, a lubricant dispenser 510, and a mounting bracket 512. The lubricant applicator 508 is substantially the same as the lubricant applicator 250 except as indicated below.

The lubricant dispenser 510 in the embodiment shown includes an ULTIMATE LUBER™ lubricant dispenser available from A.T.S. Electro-Lube International Inc. of Delta, British Columbia, Canada. United States patent publication no. 2009/0133962 to Orlitzky et al. (incorporated by reference herein in its entirety) describes some aspects of a lubricant dispenser similar to the lubricant dispenser 510. The lubricant dispenser 510 has a fluid outlet (not shown but similar to the at least one fluid outlet 360 shown in FIG. 9) in fluid communication with the lubricant applicator 508 on a first end side shown generally at 514 of the lubricant applicator 508 such that lubricant dispensed from the lubricant dispenser 510 to the lubricant applicator 508 is communicated to fluid outlets on opposite lateral sides of gear teeth of the lubricant applicator 508, such as the fluid outlets shown generally at 516, 518, 520, and 522 in FIG. 16. The lubricant dispenser 510 is also in communication with a detector 524 that is substantially the same as the detector 390 (shown in FIG. 9) and that is configured to detect magnetic fields proximate a reference point 526 and to communicate signals to a processor circuit (not shown but controls the lubricant dispenser 510 in response to signals from the detector 524 similarly to the processor circuit 386 shown in FIG. 10) of the lubricant dispenser 510.

In the embodiment shown, the mounting bracket 512 rotatably holds the lubricant applicator 508 for rotation about an axis of rotation, and a detector mounting flange 528 holds the detector 524 (and thus the reference point 526) stationary relative to the mounting bracket 512 when the lubricant applicator 508 rotates about the axis of rotation. The mounting bracket 512 is on a second end side shown generally at 530 of the lubricant applicator 508 opposite the first end side 514 of the lubricant applicator 508, and the mounting bracket 512 includes through-openings to receive respective fasteners, such as the fasteners 532 and 534 shown in FIG. 16, to mount the single-point lubricator apparatus 460 to a surface, such as the inner surface 154 of the nacelle 110 (shown in FIG. 2) for example.

On the first end side 514, the lubricant applicator 508 has magnetic elements including the magnetic elements 536, 538, 540, 542, and 544 shown in FIG. 16, and the magnetic elements of the lubricant applicator 508 are substantially the same as the magnetic elements 298, 300, 302, 304, 306, 308, 310, and 312 (shown in FIGS. 7 and 8). The magnetic elements of the lubricant applicator 508 (including the magnetic elements 536, 538, 540, 542, and 544 shown in FIG. 16) are positioned in a similar manner as the magnetic elements 298, 300, 302, 304, 306, 308, 310, and 312 (shown in FIGS. 7 and 8) to move proximate the reference point 526 in response to rotation of the lubricant applicator 508 about its axis of rotation. The single-point lubricator apparatus 506 thus functions similarly to the single-point lubricator apparatus 142, and may replace or complement the single-point lubricator apparatus 142 (shown in FIGS. 2, 7, and 9) in alternative embodiments.

Each of the single-point lubricator apparatuses 122, 130, 142, 150, 460, and 506 in the embodiment shown has a respective independent lubricant holder for holding lubricant to be dispensed to a respective element of the wind turbine 102 as described above. Thus each such independent lubricant holder may hold a lubricant selected for a respective particular element of the wind turbine 102, which may in some embodiments allow for lubricants to be selected according to characteristics of particular objects to be lubricated. For example, in the embodiment shown, the main shaft 124 turns at a lower angular speed than the generator shaft 140, and therefore a relatively light grease may be appropriate for a bearing on the generator shaft 140. Also, the gears 134 and 136 generally turn faster and more often than the gears 144 and 148, and thus again a lubricant appropriate for the gears 134 and 136 may be an open gear grease lighter than a lubricant appropriate for the gears 144 and 148, for example. In general, one skilled in the art will appreciate what lubricant or lubricants may be appropriate for particular elements of the wind turbine 102, depending on anticipated ambient temperature or other environmental or operating conditions, for example.

The single-point lubricator apparatuses 122, 130, 142, 150, 460, and 506 may include sensor assemblies including sensors for measuring one or more operational properties of the wind turbine 102. For example, each of the single-point lubricator apparatuses 122, 130, 142, 150, 460, and 506 in the embodiment shown may include one or more sensor assemblies including sensors for measuring one or more of a battery condition (such as current, voltage, or charge level more generally) of the single-point lubricator apparatus, a fluid level of lubricant in the lubricant holder of the single-point lubricator apparatus, a pressure of output lubricant fluid of the single-point lubricator apparatus, a control signal strength of a control signal received by the single-point lubricator apparatus, acceleration (or vibration) of the single-point lubricator apparatus, temperature proximate the single-point lubricator apparatus, operating load of the single-point lubricator apparatus, one or more manual settings of the single-point lubricator apparatus (such as settings of one or more switches for setting lubrication dispensing frequency, for example), rotation count of the single-point lubricator apparatus, an amount of electrical current required to dispense a predetermined amount of lubricant from the single-point lubricator apparatus, and more generally a current operating condition of the single-point lubricator apparatus. One or more such sensor assemblies may be coupled to, for example by being built into or installed in, one or more of the single-point lubricator apparatuses 122, 130, 142, 150, 460, and 506, and the single-point lubricator apparatuses themselves may be referred to as "sensor assemblies". More generally, the sensor assemblies may simply be adjacent, and not necessarily coupled to, one or more of the single-point lubricator apparatuses 122, 130, 142, 150, 460, and 506. In alternative embodiments, sensor assemblies may sense a position of a sail switch, a gas concentration (such as a concentration of a gas that may be dangerous, such as methane or carbon monoxide for example), or rotation of the lubricant applicator 250 of the single-point lubricator apparatus 142 as described above, for example.

Further, referring back to FIGS. 9, 10, and 11, although the single-point lubricator apparatus 142 in the embodiment shown is configured by one or more of the switches of the DIP switch assembly 388, in alternative embodiments the single-point lubricator apparatus 142 may be configurable by operation of the computer 186. For example, the microprocessor 404 may receive signals from the computer 186 and through the repeater apparatus 170 at a repeater apparatus interface 456, and the microprocessor 404 may adjust configuration data in a configuration data store 458 in the data memory 406. In such embodiments: the codes at block 414 may determine whether the lubricant dispenser 252 is configured to dispense lubricant in response to a predefined number of detections by retrieving configuration data from the configuration data store 458; the codes at block 420 may retrieve the predefined number from configuration data from the configuration data store 458; the codes at block 424 may retrieve the predefined number of rotations or predefined period of time, to determine an amount of lubricant to be dispensed during execution of the codes of block 424 as discussed above, from configuration data from the configuration data store 458; the codes at block 432 may retrieve the first predefined period of time from configuration data from the configuration data store 458, and the program codes 600 may retrieve the second and third predefined periods of time from configuration data from the configuration data store 458.

Referring back to FIG. 2, in the embodiment shown, one or more of the aforementioned sensor assemblies may be in wireless communication with a repeater apparatus 170 in the nacelle 110. In one embodiment, the sensor assemblies may communicate with the repeater apparatus 170 using radio signals in a frequency band from about 423 MHZ to about 433 MHz, or at a frequency of about 441 MHz, for example. In another embodiment, the sensor assemblies may communicate with the repeater apparatus 170 using radio signals in a frequency band from about 902 MHZ to about 928 MHz, or in a combination of frequency bands such as the aforementioned frequency bands. More generally, the radio signals may be in the band 40.66-40.70 and above 70 MHz, or otherwise according to 47 CFR 15.231, for example.

Further, the sensor assemblies and the repeater apparatus 170 may be in communication using a CC1110 development kit available from Texas Instruments Incorporated of Dallas, Tex., United States of America. For example, the CC1110 development kit includes SmartRF™04 evaluation boards and CC1110EM 433 MHz evaluation modules that may facilitate wireless communication using Gaussian frequency-shift keying ("GFSK") in the embodiment shown. Further, "Splatch" antennas (ANT-433-SP) available from Antenna Factor of Merlin, Oreg., United States of America may be suitable for use in a modified chassis of one of the aforementioned A.T.S. Electro-Lube™ lubricator apparatuses. For example, such "Splatch" antennas have relatively omni-directional radiation patters, which may be suitable when incorporated in a lubricator apparatus having metallic components, and such "Splatch" antennas may be connected with semi-rigid coaxial cables to modules of the CC1110 development kit. However, wireless connections are not necessary, and in alternative embodiments, one or more of the sensor assemblies may be connected by one or more wires to the repeater apparatus 170.

The single-point lubricator apparatuses 122, 130, 142, 150, 460, and 506 may further include indicators such as colored light-emitting diodes ("LEDs"), and in one embodiment a green LED indicates correct functioning of the single-point lubricator apparatus, a red LED indicates an error state of the single-point lubricator apparatus, and a third LED may indicate other information.

Figure 17:
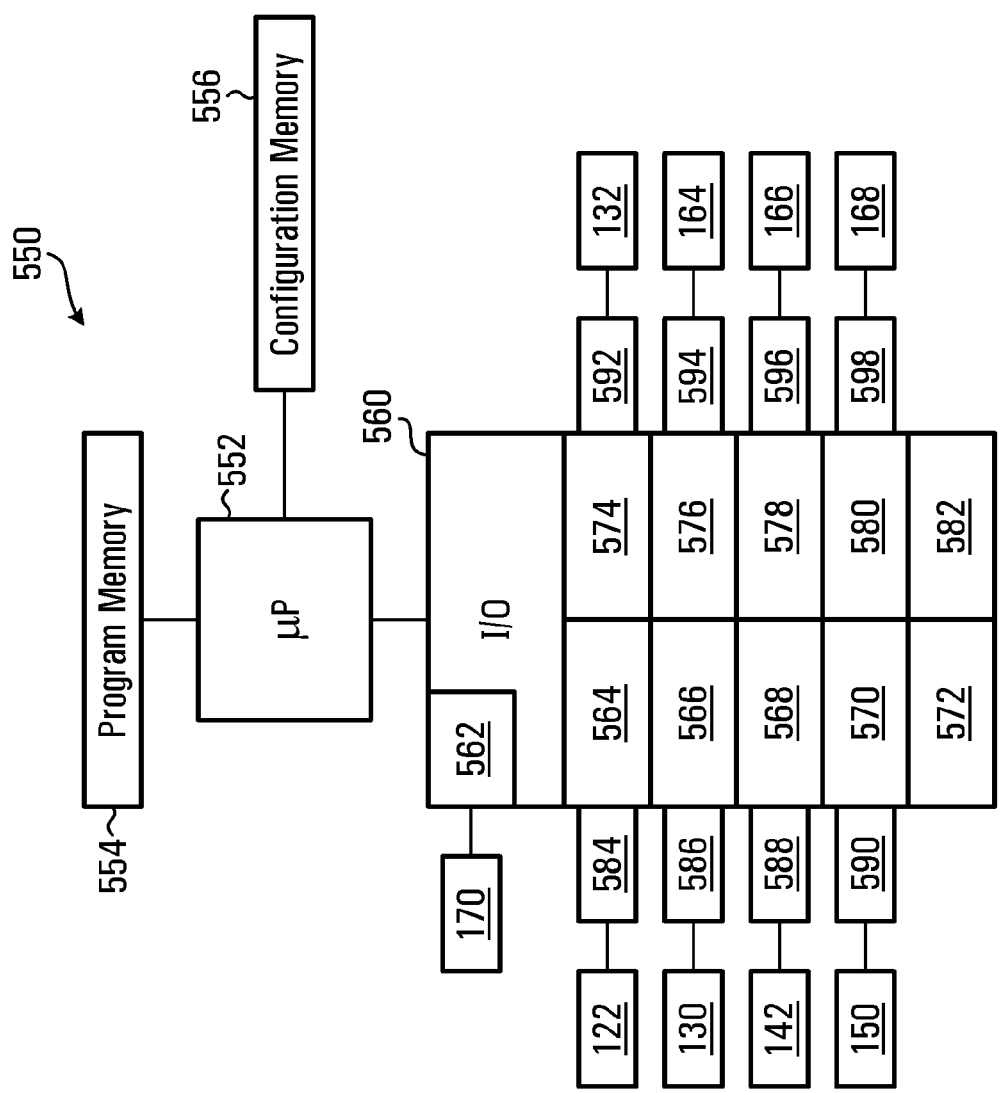
FIG. 17 is a schematic illustration of a processor circuit of a sensor assembly of the wind turbine of FIG. 2.

Referring to FIG. 17, a processor circuit 550 of a sensor assembly is illustrated schematically. In the embodiment shown, the processor circuit 550 is incorporated in the first single-point lubricator apparatus 122. However, in alternative embodiments, the processor circuit 550 may be incorporated in other lubricator apparatuses or sensor assemblies such as those described herein, or in still other embodiments the processor circuit 550 may be separate from the lubricator apparatuses and sensor assemblies such as those described herein.

The processor circuit 550 includes a microprocessor 552, and a program memory 554 and a configuration memory 556 in communication with the microprocessor 552. The program memory 554 and the configuration memory 556 may include one or more known computer-readable memories such as RAM or ROM, for example. The processor circuit 550 in the embodiment shown includes an input/output ("I/O") interface 560 also in communication with the microprocessor 552. In the embodiment shown, the program memory 554 generally has stored thereon instructions for directing the microprocessor 552 to carry out functions of the processor circuit 550. Also, the configuration memory 556 in the embodiment shown generally stores configuration information for the processor circuit 550. In alternative embodiments, some or all of such configuration information may be configured by one or more switches of a DIP switch assembly (not shown), for example. One skilled in the art will appreciate that in alternative embodiments, the processor circuit 550 may include alternative circuits such as an ASIC or other known processor circuits, for example.

The I/O interface 560 includes a communication interface 562, which in the embodiment shown is configured to communicate with the repeater apparatus 170 by wireless communication or by one or more signals transmitted electronically over at least one wire, for example. The I/O interface 560 includes communication ports 564, 566, 568, 570, 572, 574, 576, 578, 580, and 582, each of which is configured to communicate with an adaptor, although alternative embodiments may include more or fewer such ports. In general, such adaptors function as interfaces between the I/O interface 560 and various sensor assemblies or other devices as described herein.

For example, the embodiment shown includes an adaptor 584 that communicates with the port 564 and functions as an interface between the I/O interface 560 and the first single-point lubricator apparatus 122 (which, as indicated above, may also be referred to as a sensor assembly). As indicated above, in the embodiment shown, the processor circuit 550 is incorporated in the first single-point lubricator apparatus 122, and therefore the adaptor 584 may conveniently communicate with various sensors and other components of the first single-point lubricator apparatus 122, such as a controller of the first single-point lubricator apparatus 122 separate from the processor circuit 550 for example, electronically over one or more wires inside the first single-point lubricator apparatus 122. In other embodiments, the processor circuit 550 may additionally function as a control circuit for the first single-point lubricator apparatus 122, in which embodiments the processor circuit 550 may control various functions of the first single-point lubricator apparatus 122 itself, such as directly controlling a motor to dispense lubricant from the first single-point lubricator apparatus 122 for example.

In the embodiment shown, the adaptor 584 facilitates communication between the first single-point lubricator apparatus 122 and the I/O interface 560 by receiving input operational property signals each representing a measurement of at least one operational property by one or more sensors coupled to or adjacent the first single-point lubricator apparatus 122 and communicating such input operational property signals to the processor circuit 550. The adaptor 584 also facilitates communication between first single-point lubricator apparatus 122 and the I/O interface 560 by transmitting output control signals from the processor circuit 550 to the first single-point lubricator apparatus 122. For example, such output control signals may cause the first single-point lubricator apparatus 122 to dispense lubricant, or may more generally configure or control the first single-point lubricator apparatus 122.

The embodiment shown also includes an adaptor 586 that communicates with the port 566 and functions as an interface between the I/O interface 560 and the second single-point lubricator apparatus 130. As shown in FIG. 2, the second single-point lubricator apparatus 130 is spaced apart from the first single-point lubricator apparatus 122, and is thus spaced apart from the processor circuit 550 incorporated in the first single-point lubricator apparatus 122. Therefore, the adaptor 586 may include similar functions to the adaptor 584, but the adaptor 586 may conveniently communicate wirelessly with the second single-point lubricator apparatus 130, for example.

The embodiment shown also includes an adaptor 588 that communicates with the port 568 and functions as an interface between the I/O interface 560 and the third single-point lubricator apparatus 142, and an adaptor 590 that communicates with the port 570 and functions as an interface between the I/O interface 560 and the fourth single-point lubricator apparatus 150. The adaptors 588 and 590 may include similar functions to the adaptors 584 and 586, but in general the adaptors described herein may communicate wirelessly or electronically over at least one wire as may be convenient, for example, with respective sensor assemblies.

The embodiment shown also includes adaptors 592, 594, 596, and 598 that communicate with the ports 574, 576, 578, and 580 respectively to function as interfaces between the I/O interface 560 and the acceleration sensor assembly 132, the sensor assembly 164, the sensor assembly 166, and the ambient air temperature sensor assembly 168 respectively. The adaptors 592, 594, 596, and 598 generally receive, from a respective sensor assembly, input operational property signals each signals representing a measurement.

In other embodiments, such adaptors may receive control signals from the processor circuit 550 to control various devices. For example, an adaptor may receive a signal from the I/O interface 560 to control a relay (or a switch) in communication with the adaptor. The relay may control electric current to an electric motor, which may move objects in a system as may be desired. Alternatively, in some embodiments, the interface may control an electric motor directly, and in some embodiments the relay may be a safety relay shutoff to shut off one or more devices for example. Also for example, an adaptor may receive a signal from the I/O interface 560 to control various other devices, such as flow valves and dampers for example, and therefore the I/O interface 560 in some embodiments may communicate instructions to control a large variety of devices in a system as may be desired.

In the embodiment shown, the sensor assemblies other than the first single-point lubricator apparatus 122 communicate with the processor circuit 550 incorporated in the first single-point lubricator apparatus 122, and the processor circuit 550 in turn communicates with the repeater apparatus 170. However, in alternative embodiments, various sensor assemblies may communicate directly with the repeater apparatus 170 rather than through the processor circuit 550. Therefore, the repeater apparatus 170 may be referred to as a "communication apparatus", and an apparatus including the processor circuit 550 (such as the first single-point lubricator apparatus 122 in the embodiment shown) may also be referred to as a "communication apparatus".

In one embodiment, to reduce battery consumption of the sensor assemblies, the sensor assemblies described above cache data retrieved from sensors and transmit such data periodically in periodic operational property signals to one or both of the repeater apparatus 170 and the processor circuit 550. The sensor assemblies may transmit operational property signals in predetermined time intervals of five or ten minutes, for example. Alternatively, the sensor assemblies may be programmed to detect particular error conditions from the sensors (such as temperature, pressure, or acceleration above predetermined thresholds or battery charge level or fluid level of lubricant below predetermined thresholds, for example) and transmit an operational property signal in response to such error conditions immediately and independently of such a predetermined time interval. In still other embodiments, the sensor assemblies may be programmed to transmit operational property signals immediately in response to receiving data retrieved from sensors.

In the embodiment shown, the aforementioned sensor assemblies each include a processor circuit programmed to poll a sensor value periodically, and a computer readable memory encoded with program codes to direct the processor circuit to respond to a polling cycle. However, alternative embodiments may include ASICs or processors that respond to various polling cycles or interrupts, for example.

Figure 18:
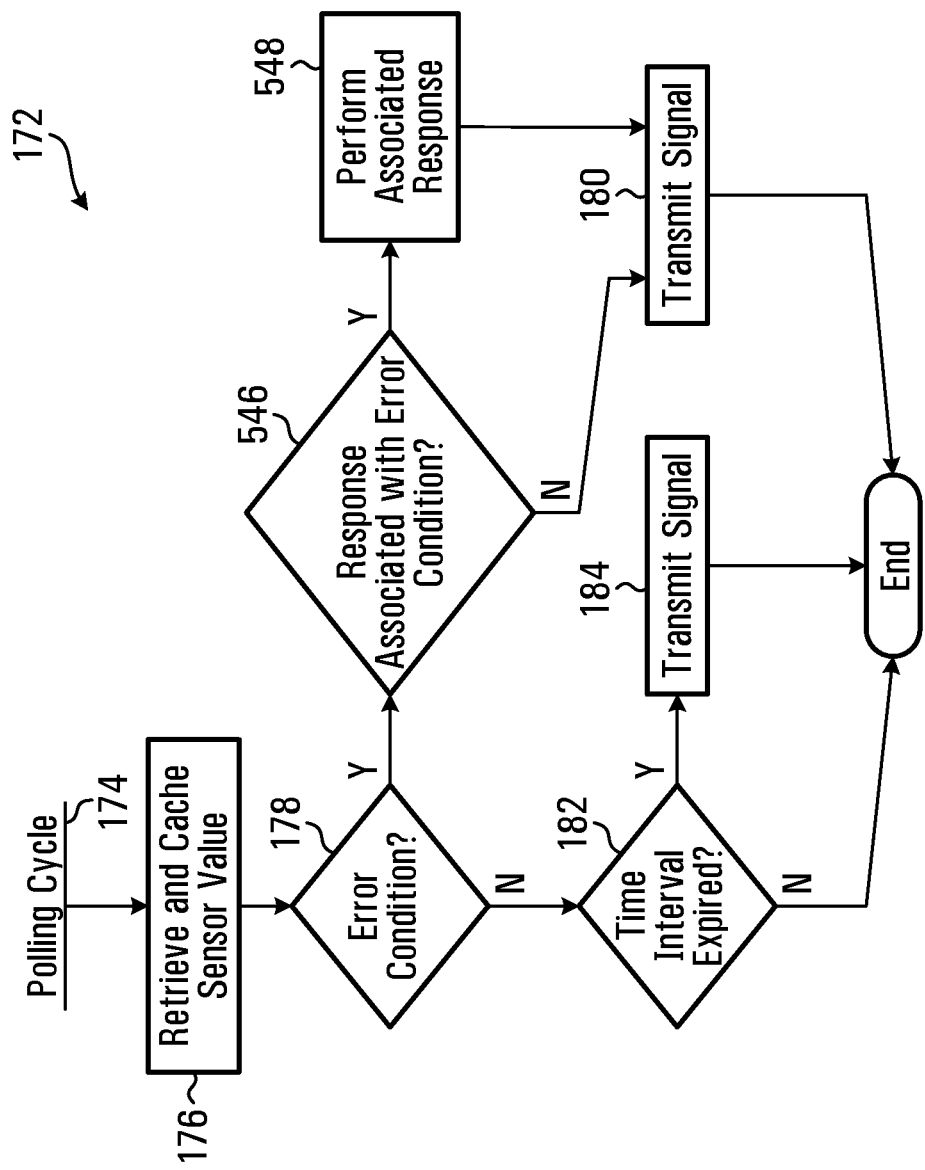
FIG. 18 is a schematic illustration of program codes in program memory of the processor circuit of FIG. 17.

Referring to FIG. 18, exemplary program instructions of one of the sensor assemblies (namely the first single-point lubricator apparatus 122 in the embodiment shown) is schematically shown generally at 172 and includes a plurality of blocks of codes generally for instructing the processor circuit 550 to respond to a polling cycle. The program instructions 172 in the embodiment shown therefore begins at 174 in response to a particular polling cycle, and continues at block 176, which includes codes for directing the processor circuit 550 to retrieve a value from a sensor of the sensor assembly and cache the retrieved value. The program instructions 172 then continue at block 178, which includes codes for directing the processor circuit 550 to determine whether the retrieved value represents an error condition (such as temperature, pressure, or acceleration above predetermined thresholds or battery charge level or fluid level of lubricant below predetermined thresholds, for example), or more generally whether the retrieved value satisfies a criterion.

If at block 178 the retrieved value represents an error condition, then the program instructions 172 continue at block 546, which includes codes for directing the processor circuit 550 to determine whether the configuration memory 556 stores a response in association with the error condition. For example, in some embodiments, the configuration memory 556 may store a shutdown response (for example, to control a relay to stop an electric motor) if a temperature exceeds a predetermined threshold, or if a temperature departs by a predetermined threshold from a normal temperature. As another example, in other embodiments, the configuration memory 556 may store a ventilation response (for example, to open a vent to atmosphere) if a gas sensor measures a concentration of a gas (such as methane for example) above a predetermined threshold. If at block 546 the configuration memory 556 stores a response in association with the error condition, then the program instructions 172 continue at block 548, which includes codes for directing the processor circuit 550 to perform the response. The codes at block 548 may direct the processor circuit 550 to cause the I/O interface 560 to control one or more devices (such as a relay or vent, for example) to perform the response.

After block 548, or if at block 546 the configuration memory 556 does not store a response in association with the error condition, the program instructions 172 continue at block 180, which includes codes for directing the processor circuit 550 to transmit an operational property signal immediately to the repeater apparatus 170 (or the processor circuit 550 in the case of alternative sensor assemblies that communicate with the processor circuit 550), and the program instructions 172 then end.

However, if at block 178 the retrieved value does not represent an error condition, then the program instructions 172 continue at block 182, which includes codes for directing the processor circuit 550 to determine whether a predetermined operational property signal time (which may be configured in the configuration memory 556 for example) interval has expired. If not, then the program instructions 172 end. But if at block 182 the predetermined operational property signal time interval has expired, then the program instructions 172 continue at block 184, which includes codes for directing the processor circuit 550 to transmit an operational property signal to the repeater apparatus 170 (or the processor circuit 550 in the case of alternative sensor assemblies that communicate with the processor circuit 550), and the program instructions 172 then end.

In the embodiment shown, when the repeater apparatus 170 receives an input operational property signal from a sensor assembly in response to either block 180 or 184, the repeater apparatus repeats the operational property signal as an output operational property signal and transmits the output operational property signal to a computer 186 shown in FIG. 1. An apparatus including the processor circuit 550 (which, as indicated above, may be referred to as a "communication apparatus") thus transmits the output operational property signal (through the repeater apparatus 170) to the computer 186. In alternative embodiments, the processor circuit 550 may transmit the output operational property signal to the computer 186 directly or through a plurality of repeater apparatuses, for example. The computer 186 may include supervisory control and data acquisition ("SCADA") software to display data collected from the various sensor assemblies described above in the wind turbine 102, and also from similar sensor assemblies in the wind turbines 104 and 106.

Measurements of temperature may indicate a viscosity of lubricant because many lubricants have known viscosities at particular temperatures. Also, an amount of electrical current required to dispense a predetermined amount of lubricant from a single-point lubricator apparatus may also indicate viscosity, because a lubricant with a higher viscosity may require more power, and thus more electrical current, to dispense. Therefore, the computer 186 may also present information on viscosity of one or more lubricants according to measurements of one or both of: temperature proximate the one or more lubricants; and amount of electrical current required to dispense a predetermined amount of the one or more lubricants.

When viewing representations of such data, an operator of the computer 186 may observe error conditions or other undesirable conditions in one of the wind turbines 102, 104, and 106, and the operator may then address such conditions by replacing batteries or replenishing lubricant, for example. Further, if the operator determines that an element (such as a bearing or gear, for example) of one of the wind turbines 102, 104, and 106 requires additional lubricant, then the operator may cause the computer 186 to transmit a control signal that the repeater apparatus 170 receives as an input control signal, and the repeater apparatus 170 may repeat the control signal as an output control signal, directing the output control signal to a particular single-point lubricator apparatus specified by the user. Alternatively, the single-point lubricator apparatus may receive the input control signal directly or through a plurality of repeater apparatuses, for example. The single-point lubricator apparatus may then respond according to the control signal, which in this example includes dispensing additional lubricant fluid.

In various embodiments, such control signals may cause a communication apparatus (such as the repeater apparatus 170 or an apparatus including the processor circuit 550 in the embodiment shown) to control a variety of devices including devices other than lubricator apparatuses. For example, as indicated above, alternative embodiments may include fluid dispenser apparatuses in place of lubricator apparatuses. Also, as indicated above, relays, flow valves, and dampers for example for example may be controlled by the processor circuit 550, and more generally by the computer 186 or by the operator of the computer 186. The operator of the computer 186 may thus cause an output control signal to be transmitted from the computer 186 to one or both of the repeater apparatus 170 and the processor circuit 550 to control one or more devices, for example to shut down a motor or to open a vent in an effort to control an undesirable condition.

In general, the sensor assemblies, lubricator apparatuses, communication apparatuses, and repeater apparatuses described herein may be battery powered to permit the sensor assemblies to be positioned on moving or remote parts of the wind turbine 102, and it has been found that the sensor assemblies may have radio signal ranges of about 50 meters (or about 164 feet) while maintaining satisfactory battery life. In contrast, the repeater apparatus 170 may have a larger battery than the sensor assemblies, or the repeater apparatus 170 may have a power source other than a battery. Therefore, the repeater apparatus may function as a "hub" of a "zone" of various sensor assemblies and single-point lubricator apparatuses, and the zone may be associated with a system such as the wind turbine 102 in the embodiment shown. In alternative embodiments, such a "zone" may be associated with one of a plurality of such systems, such as the wind turbines 102, 104, and 106.

Such a "zone" may be associated with one of many other systems, which are not at all limited to wind turbines. As one non-limiting example, such a system may include a motor vehicle, and in such a system single-point lubricator apparatuses such as those described herein may dispense lubricant to elements such as bearings and gears, and sensor assemblies such as those described herein may measure operational properties such as temperature of such elements, air pressure in one or more tires, or other operational properties such as those described herein. Such a "zone" may also be part or all of a pulp mill, sawmill, oil and gas facility, ship, factory, mine, or other location where equipment and individuals may perform tasks in potentially hazardous environments.

In general, it is believed that systems such as those described above are advantageous over other known systems for monitoring operational properties. For example, the system described above includes sensor assemblies that are coupled to (either built into or installed in), or simply adjacent, single-point lubricator apparatuses, and also sensor assemblies that are spaced apart from the single-point lubricator apparatuses, thus advantageously permitting measurement of operational properties at a wide variety of positions in the system. Further, as indicated above, the independent lubricant holders of the single-point lubricator apparatuses may hold lubricants that may be selected for particular element of the system, or depending on anticipated ambient temperature or other environmental or operating conditions, for example.

Systems such as those described above may thus advantageously permit an operator to monitor a diversity of operating parameters over a plurality of systems, and allow various corrective measures if necessary, and the ability to monitor a diversity of operating parameters over a plurality of systems may be particularly advantageous in some embodiments involving potentially hazardous environments such as methane or other flammable gases that may be ignited by operation of some devices and thus where it may be desirable to shut down such devices or other equipment, vent an area, or dispense a fluid such as a lubricant or otherwise control the environment in response to observation of an error condition or other potentially hazardous condition such as an elevated temperature of high concentration of unsafe gas in the environment, for example.

In some embodiments, each of the sensor assemblies, lubricator apparatuses, communication apparatuses, and repeater apparatuses described herein may be a self-contained unit having independent battery power. Therefore, in some embodiments, installation of a system may simpler and more cost-effective when compared to other systems because wires may not be necessary, and in some environments wires may be cumbersome or even dangerous to install. Because some embodiments of the communication apparatuses described herein may monitor various operational properties and control various devices using convenient self-contained battery-powered units that may be positioned and configured in various ways as may be desired in a particular environment.

Although specific embodiments have been described and illustrated, such embodiments should be considered illustrative of the invention only, and not as limiting the invention as construed in accordance with the accompanying claims.

What is claimed is:

1. A method of controlling a lubricator apparatus, the method comprising:
   receiving a signal representing rotation of a lubricant applicator in rotatable engagement with an object to be lubricated;
   determining whether the rotation of the lubricant applicator represented by the signal was at least a first predefined period of time after a most recent dispense of lubricant; and
   causing the lubricator apparatus to dispense lubricant through the lubricant applicator to the object to be lubricated in response to determining that the rotation of the lubricant applicator represented by the signal was at least the first predefined period of time after the most recent dispense of lubricant,
   wherein the signal represents detection proximate a reference point of at least one detectable element on the lubricant applicator.

2. The method of claim 1 wherein the lubricant applicator comprises an idler gear.

3. The method of claim 2 wherein the idler gear comprises a metallic idler gear.

4. The method of claim 1 wherein the lubricant applicator comprises a sponge.

5. The method of claim 4 wherein the sponge comprises polyethylene.

6. The method of claim 1 wherein the object to be lubricated comprises a gear.

7. The method of claim 1 wherein the object to be lubricated comprises a chain.

8. The method of claim 1 further comprising producing the signal.

9. The method of claim 1 wherein the at least one detectable element comprises at least one magnetic element.

10. The method of claim 1 wherein causing the lubricator apparatus to dispense lubricant in response to the signal comprises causing the lubricator apparatus to dispense lubricant in response to the signal representing a predefined number of detections of the at least one detectable element proximate the reference point.

11. The method of claim 1 further comprising causing the lubricator apparatus to dispense lubricant in response to a second predefined period of time passing since a most recent of
   a most recent signal representing rotation of the lubricant applicator, and
   a most recent dispense of lubricant.

12. The method of claim 1 further comprising causing the lubricator apparatus to dispense lubricant in response to a second predefined period of time passing since a most recent of
   a most recent signal representing rotation of the lubricant applicator, and
   a most recent dispense of lubricant
   if the most recent signal representing rotation of the lubricant applicator is within a third predefined period of time greater than the second predefined period of time.

13. A non-transitory computer-readable medium having stored thereon instructions to direct a processor circuit to implement a method comprising:
   receiving a signal representing rotation of a lubricant applicator in rotatable engagement with an object to be lubricated;
   determining whether the rotation of the lubricant applicator represented by the signal was at least a first predefined period of time after a most recent dispense of lubricant; and
   causing the lubricator apparatus to dispense lubricant through the lubricant applicator to the object to be lubricated in response to determining that the rotation of the lubricant applicator represented by the signal was at least the first predefined period of time after the most recent dispense of lubricant,
   wherein the signal represents detection proximate a reference point of at least one detectable element on the lubricant applicator.

14. A lubricator apparatus comprising:
   a lubricant applicator engageable for rotation about an axis of rotation with an object to be lubricated;
   a means for generating a signal representing rotation of the lubricant applicator about the axis of rotation;
   a means for determining whether the rotation of the lubricant applicator represented by the signal was at least a first predefined period of time after a most recent dispense of lubricant; and
   a means for dispensing lubricant through the lubricant applicator to the object to be lubricated in response to a determination, by the means for determining, that the rotation of the lubricant applicator represented by the signal was at least the first predefined period of time after the most recent dispense of lubricant,
   wherein the signal represents detection proximate a reference point of at least one detectable element on the lubricant applicator.

15. A lubricator apparatus comprising:
   a lubricant applicator engageable for rotation about an axis of rotation with an object to be lubricated;
   a detector configured to generate a signal representing rotation of the lubricant applicator about the axis of rotation;
   a lubricant dispenser in fluid communication with the lubricant applicator to dispense lubricant through the lubricant applicator to the object to be lubricated; and
   a processor circuit in communication with the detector to receive the signal, the processor circuit further in communication with the lubricant dispenser to control the lubricant dispenser;
   wherein the processor circuit is configured to:
      determine whether the rotation of the lubricant applicator represented by the signal was at least a first predefined period of time after a most recent dispense of lubricant; and
      cause the lubricant dispenser to dispense lubricant through the lubricant applicator to the object to be lubricated in response to determining that the rotation of the lubricant applicator represented by the signal was at least the first predefined period of time after the most recent dispense of lubricant, and further comprising at least one detectable element positioned on the lubricant applicator to move proximate a reference point in response to rotation of the lubricant applicator about the axis of rotation, wherein the detector is configured to detect the at least one detectable element proximate the reference point, and wherein the detector is configured to generate the signal in response to detection proximate the reference point of the at least one detectable element on the lubricant applicator.

16. The apparatus of claim 15 wherein the lubricant applicator comprises an idler gear.

17. The apparatus of claim 16 wherein the idler gear comprises a metallic idler gear.

18. The apparatus of claim 15 wherein the lubricant applicator comprises a sponge.

19. The apparatus of claim 18 wherein the sponge comprises polyethylene.

20. The apparatus of claim 15 wherein the object to be lubricated comprises a gear.

21. The apparatus of claim 15 wherein the object to be lubricated comprises a chain.

22. The apparatus of claim 15 wherein the at least one detectable element comprises at least one magnetic element.

23. The apparatus of claim 15 wherein the processor circuit is configured to cause the lubricant dispenser to dispense lubricant in response to the signal representing a predefined number of detections of the at least one detectable element proximate the detector.

24. The apparatus of claim 15 wherein the processor circuit is configured to cause the lubricant dispenser to dispense lubricant in response to a second predefined period of time passing since a most recent of
a most recent signal representing rotation of the lubricant applicator, and
a most recent dispense of lubricant.

25. The apparatus of claim 15 wherein the processor circuit is configured to cause the lubricant dispenser to dispense lubricant in response to a second predefined period of time passing since a most recent of
a most recent signal representing rotation of the lubricant applicator, and
a most recent dispense of lubricant
if the most recent signal representing rotation of the lubricant applicator is within a third predefined period of time greater than the second predefined period of time.

26. A system comprising:
an object to be lubricated; and
a lubricator apparatus comprising:
a lubricant applicator engageable for rotation about an axis of rotation with the object to be lubricated;
a means for determining whether the rotation of the lubricant applicator represented by the signal was at least a first predefined period of time after a most recent dispense of lubricant; and
a means for dispensing lubricant through the lubricant applicator to the object to be lubricated in response to a determination, by the means for determining, that the rotation of the lubricant applicator represented by the signal was at least the first predefined period of time after the most recent dispense of lubricant,
wherein the lubricator apparatus further comprises at least one detectable element positioned on the lubricant applicator to move proximate a reference point in response to rotation of the lubricant applicator about the axis of rotation; and a means for detecting the at least one detectable element proximate the reference point,
wherein the means for detecting is configured to detect the at least one detectable element proximate the reference point, and
wherein the means for generating is configured to generate the signal in response to detection proximate the reference point of the at least one detectable element on the lubricant applicator.

* * * * *